United States Patent
McLain

(10) Patent No.: US 11,152,969 B2
(45) Date of Patent: Oct. 19, 2021

(54) TILE BASED SATELLITE PAYLOAD SYSTEMS AND ASSOCIATED METHODS THEREOF

(71) Applicant: Panasonic Avionics Corporation, Lake Forest, CA (US)

(72) Inventor: Christopher McLain, Portland, OR (US)

(73) Assignee: Panasonic Avionics Corporation, Lake Forest, CA (US)

( * ) Notice: Subject to any disclaimer, the term of this patent is extended or adjusted under 35 U.S.C. 154(b) by 250 days.

(21) Appl. No.: 16/415,030

(22) Filed: May 17, 2019

(65) Prior Publication Data

US 2020/0280334 A1    Sep. 3, 2020

Related U.S. Application Data

(60) Provisional application No. 62/778,199, filed on Dec. 11, 2018, provisional application No. 62/770,485, filed on Nov. 21, 2018.

(51) Int. Cl.
*H04B 1/44* (2006.01)
*H01Q 15/14* (2006.01)
*H04B 7/185* (2006.01)

(52) U.S. Cl.
CPC ............ *H04B 1/44* (2013.01); *H01Q 15/14* (2013.01); *H04B 7/1851* (2013.01)

(58) Field of Classification Search
CPC ........ H01Q 15/14; H04B 1/44; H04B 7/1851; H04B 7/18515; H04B 1/40; H04B 1/00
See application file for complete search history.

(56) References Cited

U.S. PATENT DOCUMENTS

| | | | | |
|---|---|---|---|---|
| 5,129,099 A * | 7/1992 | Roberts | ..................... | G01S 7/03 333/1.1 |
| 5,991,312 A * | 11/1999 | Koenig | ..................... | H04J 3/14 370/535 |
| 6,459,885 B1 * | 10/2002 | Burgess | ................... | H04B 1/48 455/275 |
| 6,591,086 B1 * | 7/2003 | Pleasant | ................... | H04B 1/56 370/278 |
| 2008/0291083 A1 * | 11/2008 | Chang | ..................... | H04B 7/086 342/354 |

(Continued)

OTHER PUBLICATIONS

D. Del Corso et al., "Architecture of a Small Low-Cost Satellite," 10th Euromicro Conference on Digital System Design Architectures, Methods and Tools (DSD 2007), Lubeck, Germany, 2007, pp. 428-431, doi: 10.1109/DSD.2007.4341503. (Year: 2007).*

(Continued)

*Primary Examiner* — Ayaz R Sheikh
*Assistant Examiner* — Tarell A Hampton
(74) *Attorney, Agent, or Firm* — Klein, O'Neill & Singh, LLP

(57) ABSTRACT

Methods and systems for satellite payloads are provided. A first system is based on using a focal plane array tiles with a reflector. A second system uses active lens tiles, focal plane array tiles and the reflector. A third system includes active reflector tiles, focal plane array tiles and the reflector. Yet another system enables beam power sharing by selectively providing power to solid state power amplifiers used in satellite payloads. Another system uses multiple microsatellites for providing satellite coverage for an area.

19 Claims, 18 Drawing Sheets

(56) References Cited

U.S. PATENT DOCUMENTS

| | | | | |
|---|---|---|---|---|
| 2010/0060521 | A1* | 3/2010 | Hayes | H01Q 19/138 342/368 |
| 2010/0197231 | A1* | 8/2010 | Kenington | H04B 1/525 455/63.1 |
| 2011/0195675 | A1* | 8/2011 | Nitsche | H04B 1/40 455/90.2 |
| 2014/0152492 | A1* | 6/2014 | Zimmerman | H01Q 1/08 342/352 |
| 2015/0244405 | A1* | 8/2015 | Pera | H01Q 1/2291 375/219 |
| 2016/0226551 | A1* | 8/2016 | Brown | H01Q 5/28 |
| 2017/0331176 | A1 | 11/2017 | Levy et al. | |
| 2018/0277948 | A1* | 9/2018 | Brown | H01Q 3/20 |

OTHER PUBLICATIONS

D. Del Corso, C. Passerone, L. Reyneri, C. Sansoe, S. Speretta and M. Tranchero, "Design of a University Nano-Satellite: the PiCPoT Case," in IEEE Transactions on Aerospace and Electronic Systems, vol. 47, No. 3, pp. 1985-2007, Jul. 2011, doi: 10.1109/TAES.2011.5937278. (Year: 2011).*

T. Dreischer, K. Kudielka, L. Gallmann, T. Weigel, A. Marki and G. C. Baister, "System concept of an integrated RF-optical transceiver for deep space TT&C," 2004 IEEE Aerospace Conference Proceedings (IEEE Cat. No. 04TH8720), Big Sky, MT, USA, 2004, p. 1531 Vol. 3, doi: 10.1109/AERO.2004.1367926. (Year: 2004).*

A. Natarajan, A. Valdes-Garcia, B. Sadhu, S. K. Reynolds and B. D. Parker, "$W$-Band Dual-Polarization Phased-Array Transceiver Front-End in SiGe BiCMOS," in IEEE Transactions on Microwave Theory and Techniques, vol. 63, No. 6, pp. 1989-2002, Jun. 2015, doi: 10.1109/TMTT.2015.2422691. (Year: 2002).*

S. V. Hum and J. Perruisseau-Carrier, "Reconfigurable Reflectarrays and Array Lenses for Dynamic Antenna Beam Control: A Review," in IEEE Transactions on Antennas and Propagation, vol. 62, No. 1, pp. 183-198, Jan. 2014 (Year: 2014).*

* cited by examiner

TILE BASED SATELLITE PAYLOAD SYSTEMS AND ASSOCIATED METHODS THEREOF

CROSS-REFERENCE TO RELATED APPLICATIONS

This patent application claims priority under 35 USC 119(e) to U.S. Provisional Patent Applications, Ser. No. 62/770,485, filed on Nov. 21, 2018, entitled "Tile Based Satellite Communications Payloads and Satellite Dynamic Power Sharing Using SSPAs," and Ser. No. 62/778,199, filed on Dec. 11, 2018, entitled "A System of Micro High Throughput Satellites for Mobility Services," the disclosure of which are incorporated herein by reference in their entirety.

TECHNICAL FIELD

The present disclosure relates to satellite payloads and more particularly, to modular satellite payload systems and associated methods thereof.

BACKGROUND

Satellite communication is commonly used by transportation vehicles, including aircrafts to send and receive information. A satellite typically uses a communication "payload" that transmits and receives signals.

Current technology, especially for streaming audio/video demands higher bandwidth from satellite payloads. High Throughput Satellites (HTS) are being used to accommodate the higher bandwidth demand. HTS based systems use multiple spot beams to cover a geographic area. Spot beams enable an allocated frequency spectrum for satellite communication to be reused multiple times by the same payload. Smaller spot beams allow satellite power to be concentrated and individual transponders on the payload to support more bandwidth.

A typical HTS system may use 40 to 80 spot beams with approximately, 80 to 100 transponders. The transponder is a basic unit of a satellite payload. The transponder includes various components for receiving and transmitting a beam. The cost of building a transponder chain for a payload can be several millions of dollars. One reason why the transponder cost is high is because payloads are complex, unique and often hand built. For example, a HTS payload internal waveguide layout of a KaSat may have numerous (e.g. 2500) custom made, waveguide sections connecting various spot beams (e.g. 80) and numerous (e.g. 65) Traveling Wave Tube Amplifiers (TWTAs). The TWTAs are used to support high radio-frequency (RF) powers (e.g. greater than 100 W). Typically, each waveguide section is customized and placed manually within the payload. The TWTAs use high power vacuum tubes that require special manufacturing techniques and equipment. Other components, such as cavity filters used for channel filtering are also hand tuned by manually adjusting screws in a side of a cavity. Therefore, building conventional HTS payloads is time consuming and cost prohibitive. Furthermore, conventional HTS components are heavy and large, which produces design challenges for meeting the demand for increased bandwidth. Therefore, a better architectural solution is needed for HTS systems.

In conventional satellite systems, power sharing between satellite beams is accomplished by TWTAs, cavity filter Output Multiplexers (OMUX) and Multi-Port Amplifiers ("MPAs"). These components are complex, heavy and only allow power sharing between a limited numbers of beams.

The distribution of user traffic varies over the surface of the earth over time. This occurs for fixed applications because different time zones have different diurnals, and for mobile applications the user terminals move over the course of the day. The change in distribution of user traffic over time is particularly apparent in aeronautical traffic patterns where aircraft fleets move from one region (e.g. North America) to another region (e.g. Europe) and back again within twenty four hours. The movement of traffic within an area would not be a problem if an entire area were covered in a single wide beam. However, conventional HTSs divide regions into smaller spot beams in an attempt to improve performance and the economics of a satellite. Breaking a region into smaller beams leads to a situation where moving traffic creates independent peaks in time for each beam. Providing capacity for a peak in each beam results in wasted capacity over the course of the day. A better solution is needed for power sharing between satellite beams.

HTS systems using multiple beams have been steadily replacing wide beam satellites for mobility services. Typically, as mentioned above, HTS based payloads use multiple spot beams to increase capacity obtained from a same orbital slot. The disadvantage of HTS payloads is their size, complexity, time to market, cost and lack of flexibility. For example, the mass of a typical HTS system ranges from 3000 kg to 6000 kg, with thousands of hand-built components. Often it takes 3 to 4 years to build and deploy a HTS system. Furthermore, most HTS systems are customized and tailored to a specific orbital slot, coverage area and ground stations. A typical, conventional HTS system can cost between $300M to $600M dollars, which makes them risky and expensive investments. A better solution to conventional HTS systems that can efficiently use spot beams is needed.

SUMMARY

Methods and systems for satellite payloads are provided. In one aspect, a payload system is provided that includes a plurality of focal plane array tiles arranged in an array interfacing with a reflector for receiving and transmitting signals. A focal plane array tile of the plurality of focal plane array tiles includes a receive segment, a transmit segment and a switching module. The receive segment includes a first filter that isolates a receive signal from a transmit signal, a low noise amplifier that amplifies the receive signal and a first frequency conversion module that converts frequency of the received signal to an Intermediate Frequency. The transmit segment includes a second frequency conversion module that converts a frequency of the transmit signal to a Radio Frequency. The switching module receives an output from the receive segment and switches the output to another focal plane array tile.

In another aspect, a satellite payload system includes a plurality of active lens tiles interfacing with a plurality of focal plane tiles that interfaces with a reflector for receiving and transmitting signals. An active lens tile of the plurality of active lens tiles includes a receive segment and a transmit segment. The receive segment of the active lens tile includes a first filter to isolate a receive signal from a transmit signal at the transmit segment, and a low noise amplifier to amplify the receive signal. The transmit segment of the active lens tile includes a high power amplifier to amplify an output of a phase shifter receiving the transmit signal.

A focal plane tile of the plurality of focal plane tiles includes a receive segment, a transmit segment and a switching module. The receive segment of the focal plane tile includes a first frequency conversion module to convert frequency of the received signal to an Intermediate Frequency. The transmit segment of the focal plane tile includes a second frequency conversion module to convert a frequency of the transmit signal to a Radio Frequency. The switching module receives an output from the receive segment of the focal plane tile and switches the output to another focal plane tile.

In yet another aspect, a satellite payload system includes a plurality of active reflector tiles interfacing with a plurality of focal plane tiles interfacing with a reflector for receiving and transmitting signals. An active reflector tile of the plurality of active lens tiles include a receive segment and a transmit segment. The receive segment of the active lens tile includes a first circulator to isolate a receive signal from a transmit signal of the transmit segment and a low noise amplifier to amplify the receive signal. The transmit segment of the active reflector tile includes a second circulator to isolate the transmit signal from the receive signal and a high power amplifier to amplify an output of a phase shifter receiving the transmit signal.

A focal plane tile of the plurality of focal plane tiles includes a receive segment, a transmit segment and a switching module. The receive segment of the focal plane tile includes a first frequency conversion module to convert a frequency of the received signal to an Intermediate Frequency. The transmit segment of the focal plane tile includes a second frequency conversion module that converts a frequency of the transmit signal to a Radio Frequency. The switching module receives an output from the receive segment of the focal plane tile and switches the output to another focal plane tile.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter. Conditional processing/routing may be expressed by either if or when qualifiers, which are used interchangeably herein and intended to have the same meaning.

In one aspect, the technology disclosed herein provides a cost-effective solution for HTS ("High Throughput Satellite") payloads. Novel payload architectures/configurations are disclosed that use mass produced integrated circuit (IC) modules and tiled together to form a payload. The payload systems disclosed herein are lighter, cheaper than conventional systems and easier to assemble. In addition to standard transponder functions, the architecture described supports frame switching functionality to support beam hopping (also known as satellite switched time division multiple access (TDMA)).

In one aspect, payload tiles are disclosed that use similar technology with similar transmit and receive functionality. The tiles are used to feed a deployable or unfurlable reflector, support large number of spot beams (e.g. hundreds or thousands) and provide gain to support high bandwidths with lower power usage vis-à-vis conventional, expensive, heavy and difficult to manufacture HTS systems. In some cases, the payload tiles may be utilized as direct radiating antennas, eliminating the need for a reflector, as described below in detail.

Figure 1A:
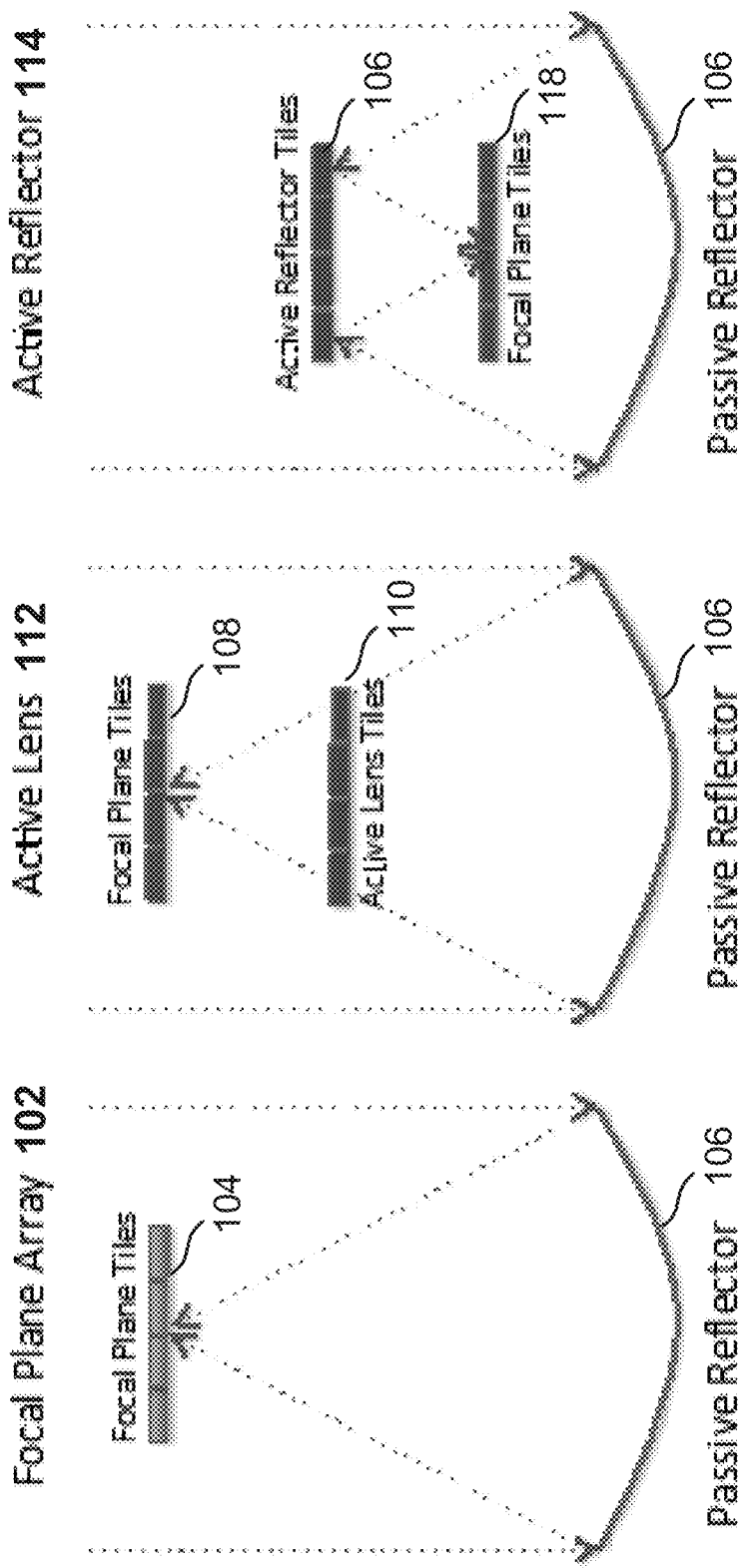
FIG. 1A shows an example of a plurality of satellite payload systems, according to one aspect of the present disclosure.

Payload Systems:

FIG. 1A shows an example of three different payload systems (or configurations/architectures, used interchangeably throughout this specification) using the tiled payload technology, according to one aspect of the present disclosure. In one aspect, a focal play array system 102 (may also be referred to as system 102 or configuration 102) is provided. System 102 includes a plurality of focal plane tiles 104 that receive a beam from a passive reflector 106 and transmit the beam to the passive reflector 106. Details regarding system 102 and focal plane tiles 104 are provided below.

In another aspect of the present disclosure, an active lens system 112 (may also be referred to as system 112 or configuration 112) is provided with a plurality of focal plane tiles 108 and a plurality of active lens tiles 110. Details regarding system 112 as well as tiles 108 and 110 are provided below.

In yet another aspect of the present disclosure, an active reflector system 114 (may also be referred to as system 114 or configuration 114) is provided with a plurality of active reflector tiles 116 and a plurality of focal plane tiles 118. Details regarding system 114 as well as tiles 116 and 118 are provided below.

The differences between the various configurations of FIG. 1A depend on the relationship of the tiles with respect to reflector 106 and how transponder and switching functions are split between the focal plane and active lens/reflector tiles, as described below in detail.

In one aspect, although systems 102, 112 and 114 are shown using the passive reflector 106, the adaptive aspects of the present disclosure are not limited to the passive reflector 106. The active lens system 112 and the active reflector system 114 may be configured to operate in a direct radiating mode without the passive reflector 106. Furthermore, although for simplicity, FIG. 1A shows coaxial configurations, other arrangements such as offset feeds, Gregorian or Cassegrain configurations may be used with the novel tile based payloads of the present disclosure.

Figure 1B:
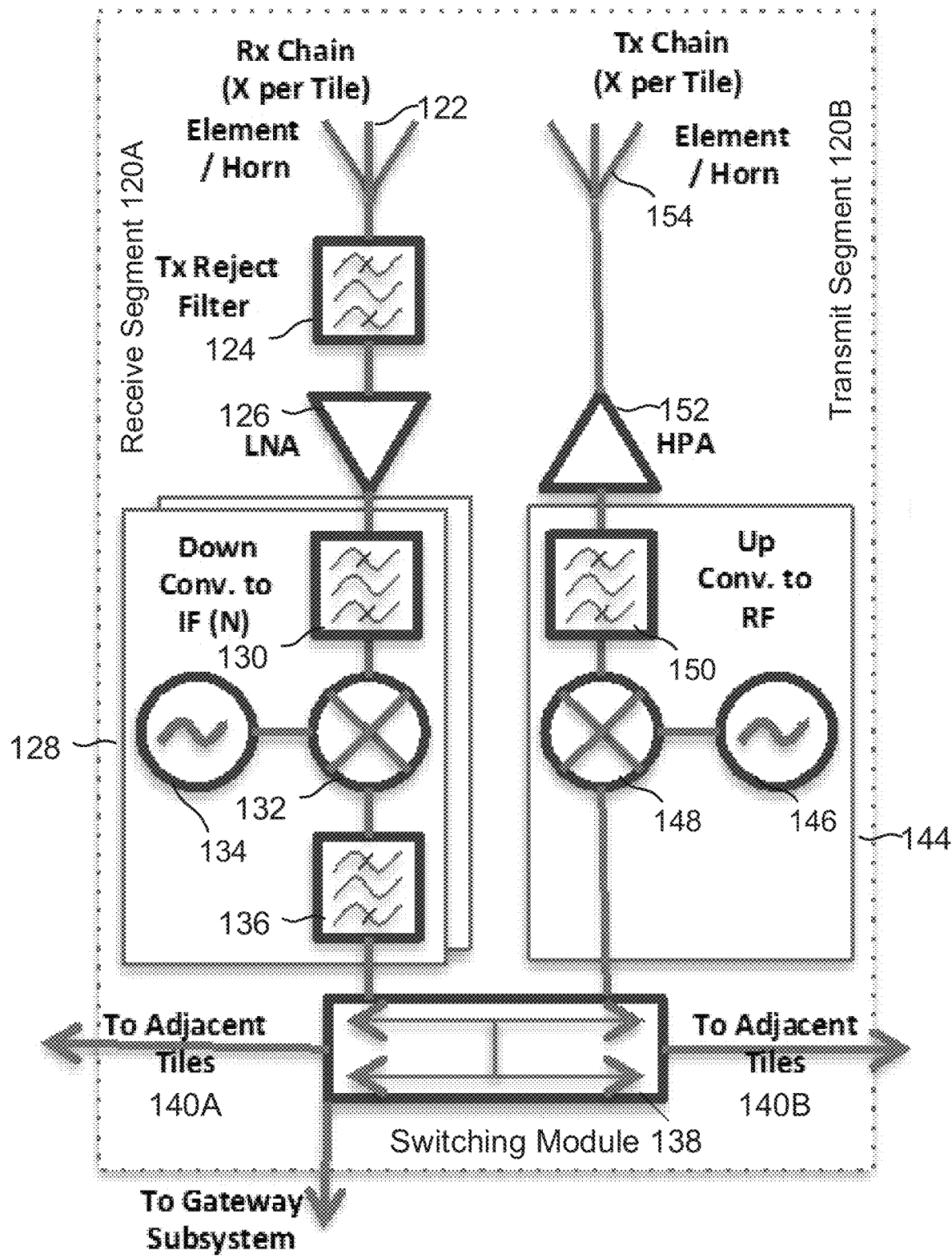
FIG. 1B shows an example of a focal plane array tile, according to one aspect of the present disclosure.

Focal Plane Array Tiles:

FIG. 1B shows a block diagram of a focal plane array tile 120 (may be referred to as tile 120) of the focal plane array tiles 104 of system 102, according to one aspect of the present disclosure. Multiple focal plane array tiles are arranged in an array to operate as a satellite payload. The various components of the focal plane array tile 120 can be manufactured with integrated circuits components using standard manufacturing techniques.

In one aspect, tile 120 includes a receive (Rx) segment 120A that processes received signals, and a transmit (Tx) segment 120B that processes transmit signals with interleaved Rx element 122 and Tx element 154. In one aspect, the Rx element 122 is configured to receive an incoming signal. The Rx element 122 may be grouped together with other Rx elements to form an Rx chain. The incoming signal passes through a reject filter 124 that isolates the received signal from noise in the transmit segment 120B. In one aspect, orthogonal polarization may be used to isolate the received signal from transmit segment noise.

An output from filter 124 is amplified by a low noise amplifier (LNA) 126 to an operating level. An output from LNA 126 is provided to a "down conversion" module (shown as "Down Conv to IF (N)" (used interchangeably throughout this specification)) 128 (may be referred to as "module 128") that converts the frequency of the output from LNA 126 to an Intermediate Frequency ("IF") or to a transmit segment frequency level. Module 120 includes filters 130 and 136, a mixer 132 and an oscillator 134 to perform the frequency conversion.

An output in the IF range from module 128 is provided to a switching module (shown as IF switching module, used interchangeably throughout this specification) 138. The switching module 138 routes the output from module 128 to adjacent tiles 140A/140B, to a switching gateway subsystem 142 or to the Tx segment 120B. The gateway subsystem 142 may be used to route signals between tile arrays.

The Tx segment 120B includes an "up conversion" module (shown as "Up Conv. To RF" or "UP Con. To Ku" (FIGS. 1D and 1G-1I)(used interchangeably throughout this specification)) 144 that converts an incoming signal to an RF (Radio-Frequency) signal, based on the strength of the incoming signal from a Rx element. Module 144 includes a mixer 148, an oscillator 146 and a filter 150 that are used to convert the frequency of the incoming signal to an RF signal. The RF signal output from module 144 is provided to a high power amplifier (HPA) 152 that amplifies the received RF signal output. HPA 152 may be Gallium Arsenide (GaAs), Silicon Germanium (SiGe), Gallium Nitride (GaN) or any other amplifier type. An output from the HPA 152 is transmitted by the TX element 154. Similar to the RX elements, one or more Tx elements 154 may be combined to create a Tx chain.

In one aspect, tile 120 is mounted to a backplane (not shown) that provides DC power, commands and signal connection to adjacent tiles. The backplane may include heat pipes (not shown) for thermal control.

As mentioned above, the Tx and Rx elements are interleaved within a same time. This is cost-effective since only one kind of tile is used to construct the payload. To isolate the Tx and Rx paths, the Tx and Rx elements may be placed orthogonal to each other. The cross polarization isolation would provide some inherent isolation between the Tx and Rx paths. To use both type of polarizations would involve using two reflectors and two identical focal plane arrays with one array rotated 90 degrees to each other.

Another option for isolating the Tx and Rx signals would be to split the Tx and Rx functions into separate tiles. This option would use two reflectors but with two different types of focal plane array tiles.

Yet another solution for isolating the Tx and Rx signals would be to operate the Tx and Rx elements in a half-duplex mode for a given beam, if the beam uses satellite switched TDMA. If the transmit duty cycle is not 100%, then uplink transmissions would be interleaved in time with downlink transmissions. The only isolation required in this implementation would be between adjacent beams. Half-duplex would not limit the overall capacity of the payload but may limit the maximum uplink and downlink rates for a beam.

In one aspect, system 102 can be used for applications where the demand is relatively uniformly distributed over a spatially coverage area and over time.

In one aspect, the focal plane array tile 120 components i.e. the receive and transmit feed elements 122/154, LNA 126, down frequency converter 128, HPA 152, up converter 144, and switching module 138 can be mass produced and tiled to form a payload. The manufacturing cost and assembly time for system 102 will be less than conventional HTS systems.

Figure 1C:
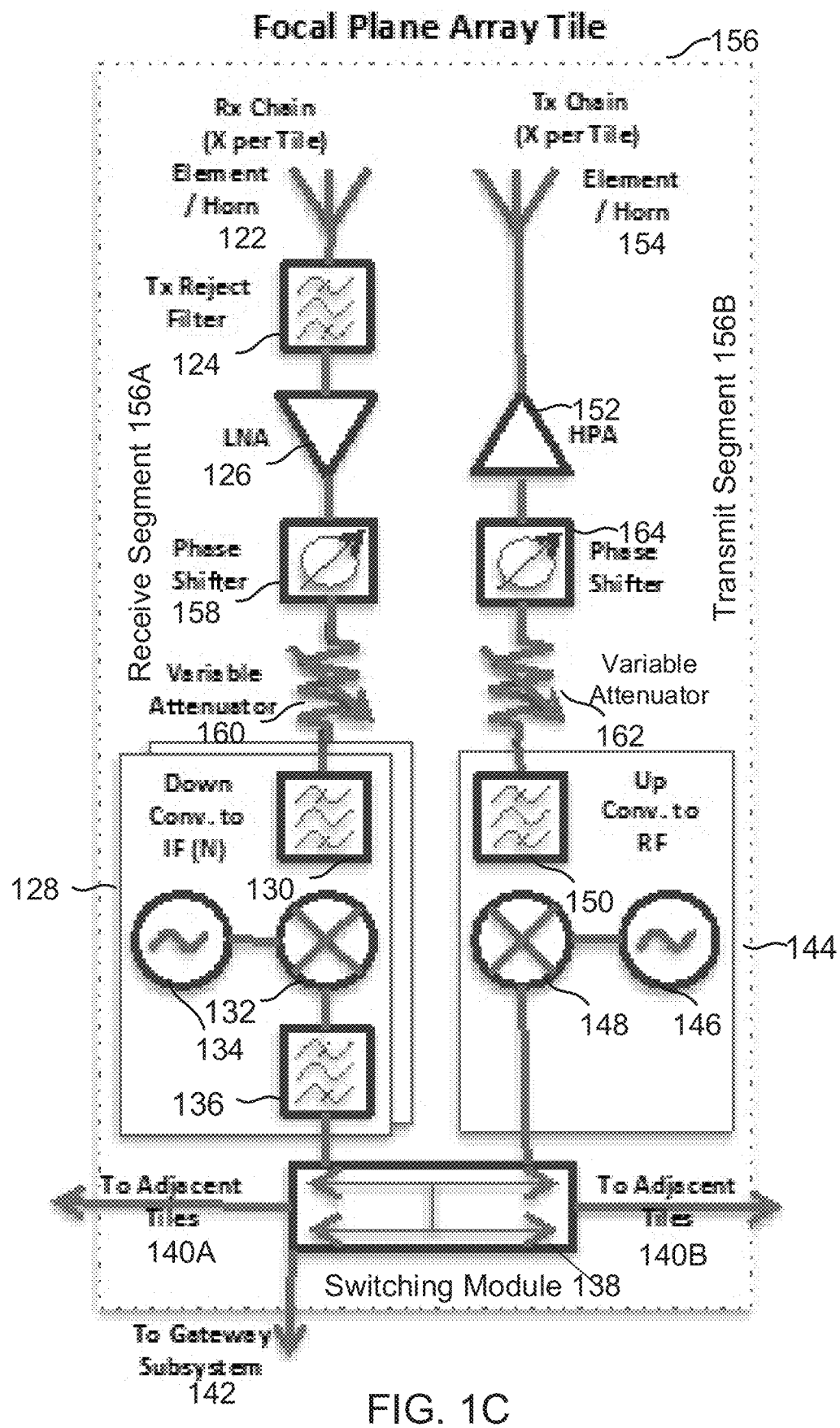
FIG. 1C shows another example of a focal plane array tile, according to one aspect of the present disclosure.

FIG. 1C shows another example of a focal plane array tile 156 (may be referred to as Tile 156) with a Rx segment 156A and a Tx segment 156B, according to one aspect of the present disclosure. Tile 156 has various components that are similar to the components of tile 120, e.g. reject filter 124, LNA 126, module 128, HPA 152, module 144 and switching module 138. The common components of tile 156 and 120 perform the same functions as described above, and hence, the common components are not described again.

In addition to the common components of tile 120, tile 156 also includes a phase shifter 158 and a variable attenuator 160 in the Rx segment 156A, and a variable attenuator 162 and a phase shifter 164 in the transmit segment 156B. The phase shifters 158 and 164 provide controllable phase shift of an RF signal. The variable attenuators 160 and 162 use a circuit that decreases the strength of an input signal either continuously or step by step without appreciable signal distortion, while substantially maintaining constant impedance match.

The phase shifters and attenuators of tile 156 provide better amplitude and phase control across the feed elements for a given beam. This provides better illumination control of the main reflector and higher antenna efficiencies. Attenuators 160 and 162 are also useful for implementing gain control to allow downlink signals to be operated at a known power level by compensating for uplink fades and path losses at a payload.

In one aspect, only amplifiers that are needed are activated at any given time. For example, the amplifiers may be key-lined and are active only when transmitting frame. Key-lining reduces thermal dissipation and power consumption in a payload.

In yet another aspect, the switching function in a tile enables different element subsets to be activated at any given time. Unlike a conventional horn feed reflector where beam centers are fixed, the switching functionality of switching module 138 can be used to shift a beam peak and enables a beam to be directed to a single terminal. In a typical horn feed reflector system, the roll-off from peak to edge is 4.5 dB. Being able to shift the peak by half of a beam diameter would reduce the roll-off to 1.1 dB, saving 3.4 dB. This would provide the same performance with less than half the power of a conventional horn feed system.

In one aspect, a satellite payload system is provided. The payload system includes a plurality of focal plane array tiles arranged in an array interfacing with a reflector for receiving and transmitting signals. A focal plane array tile from the plurality of focal plane array tiles includes a receive segment, a transmit segment and a switching module. The receive segment includes a first filter that isolates a receive signal from a transmit signal, a low noise amplifier that amplifies the receive signal and a first frequency conversion module that converts frequency of the received signal to an Intermediate Frequency. The transmit segment includes a second frequency conversion module that converts a frequency of the transmit signal to a Radio Frequency. The switching module receives an output from the receive segment and switches the output to another focal plane array tile.

Figure 1D:
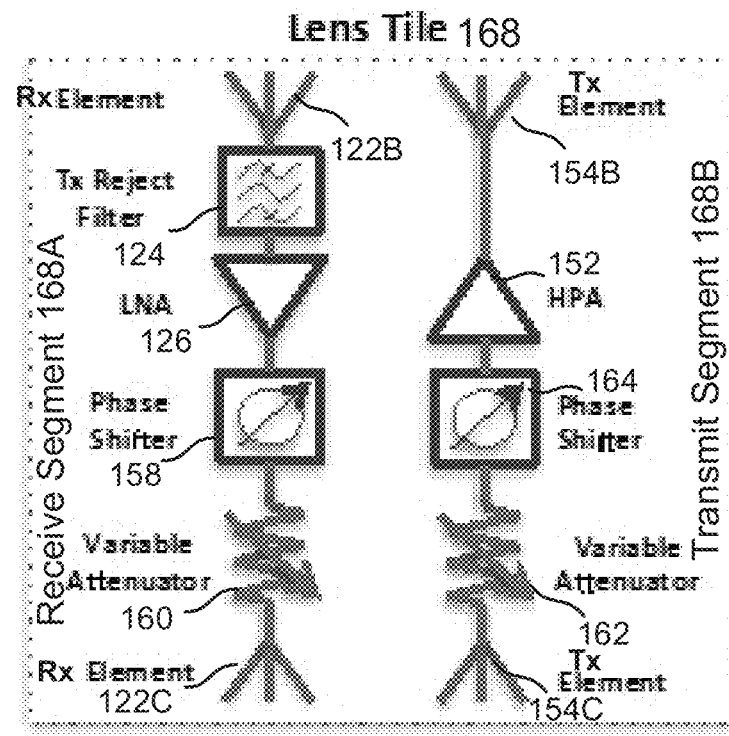
FIG. 1D shows an example of an active lens tile and a focal plane tile, according to one aspect of the present disclosure.
Figure 1D:
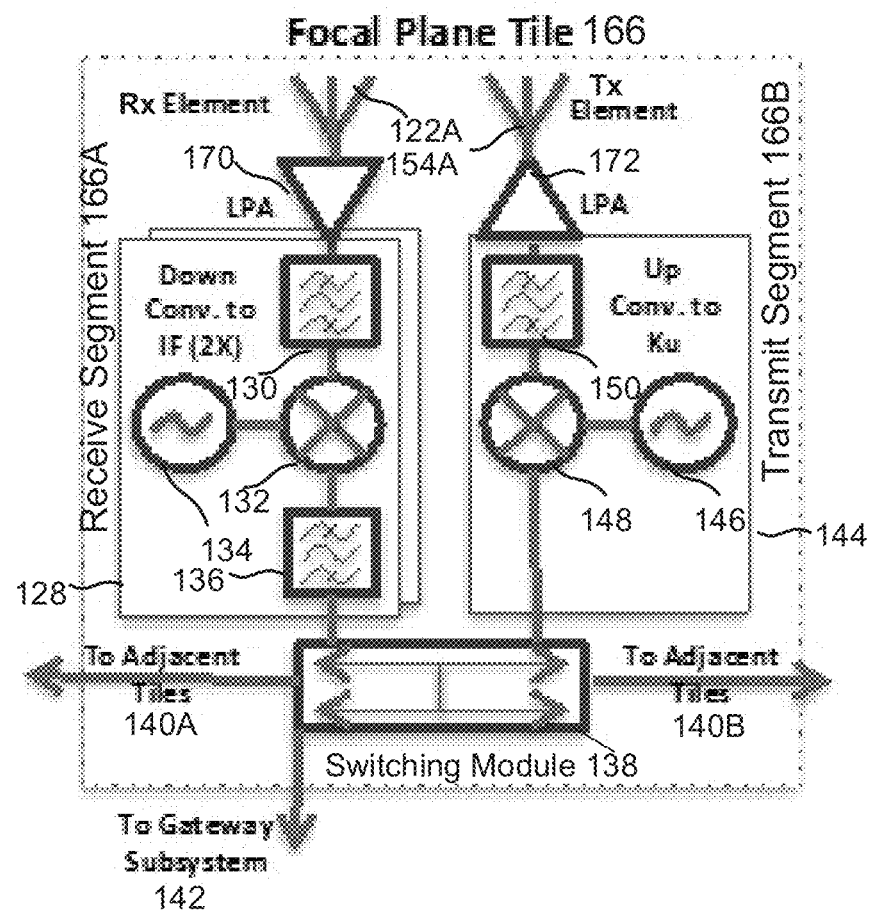

Active Lens System 112:

FIG. 1D shows a focal plane tile 166 and a lens tile 168 of the active lens system 112, according to one aspect of the present disclosure. In one aspect, the functionality of the focal plane array tile 120 described above with respect to FIGS. 1B/1C is split between the lens tile 168 and the focal plane tile 166 such that signal amplification is separated from signal feed and switching. By separating amplification from the feed array, the amplification need is diminished, which uses less power for each tile.

In one aspect, the lens tile 168 includes a Rx segment 168A and a Tx segment 168B. The Rx element 122B and TX element 154B face outward towards the passive reflector 106 (FIG. 1A). Elements 122C and 154C face inwards towards the focal plane tile 166 with elements 122A/154A.

The lens tile 168 includes the phase shifter 158 in the Rx segment 168A and 164 in the transmit segment 168B. The lens tile 168 also includes the variable attenuator 160 in the Rx segment 168A and 162 in the Tx segment 168B. The phase shifters and the attenuators enable the lens tile 168 to create a phase and amplitude distribution across the lens, essentially providing its own focal length. This enables the lens tile 168 to operate in a direct radiating configuration without a passive reflector and reduces the focal length and size of a feed array.

In one aspect, the focal plane tile 166 provides a feed array using element 122A in a Rx segment 166A and element 154A in a Tx segment 166B. A low power amplifier (LPA) 170 in the receive segment and 172 in the transmit segment may be used to maintain a signal level within the focal plane tile 166. It is noteworthy that LPAs 170 and 172 are optional and may not be needed since signal loss between lens tile 168 and the focal plane tile 166 is minimal.

Module 128 of focal plane tile 166 is similar to the module 128 of the focal plane tile 120 of FIG. 1B described above. Similarly module 144 of focal plane tile 166 is similar to the module 144 of focal plane tile 120. The IF switching module 138 of focal plane tile 168 also performs the same function as module 138 of focal plane tile 120 described above with respect to FIG. 1B. These common components of tile 166 and tile 120 are not described again in detail.

In one aspect, the focal plane tile 166 may be mounted to a backplane that provides DC power and signal connection among adjacent tiles. The back plane may not need heat pipes since power levels at the focal plane tile 166 are low.

In one aspect, the lens tile 168 may be mounted on a frame (not shown) that enables the lens tiles to face inwards towards the focal plane tiles 166 and outwards to the passive reflector 106.

Figure 1E:
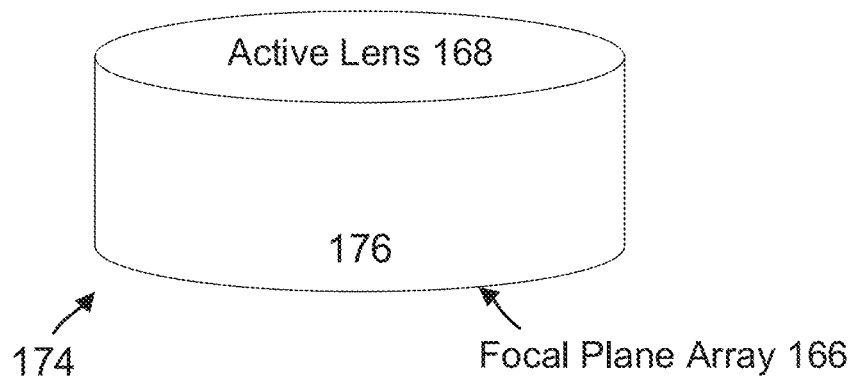
FIG. 1E shows an arrangement for using the active lens tile and the focal plane tile of FIG. 1D, according to one aspect of the present disclosure.

It is noteworthy that the lens tile 168 does not perform frequency conversion. It receives transmit signals on a backside of the lens at the same frequency and then transmits them on the front side. In one aspect, a canned shaped structure 174 as shown in FIG. 1E may be used for placing the lens tile 168 and the focal plane tile 166. The canned shaped structure 174 places the active lens 168 on top, and the focal plane tiles 166 at the bottom. A sidewall structure 176 is located between the lens and focal plane tiles.

In one aspect, a satellite payload system is provided. The system includes a plurality of active lens tiles interfacing with a plurality of focal plane tiles that interface with a reflector for receiving and transmitting signals. An active lens tile of the plurality of active lens tiles includes a receive segment and a transmit segment. The receive segment of the active lens tile includes a first filter to isolate a receive signal from a transmit signal of the transmit segment and a low noise amplifier to amplify the receive signal. The transmit segment of the active lens tile includes a high power amplifier to amplify an output of a phase shifter receiving the transmit signal.

A focal plane tile of the plurality of focal plane tiles includes a receive segment, a transmit segment and a switching module. The receive segment of the focal plane tile includes a first frequency conversion module to convert frequency of the received signal to an Intermediate Frequency. The transmit segment of the focal plane tile includes a second frequency conversion module that converts a frequency of the transmit signal to a Radio Frequency. The switching module receives an output from the receive segment of the focal plane tile and switches the output to another focal plane tile.

Figure 1F:
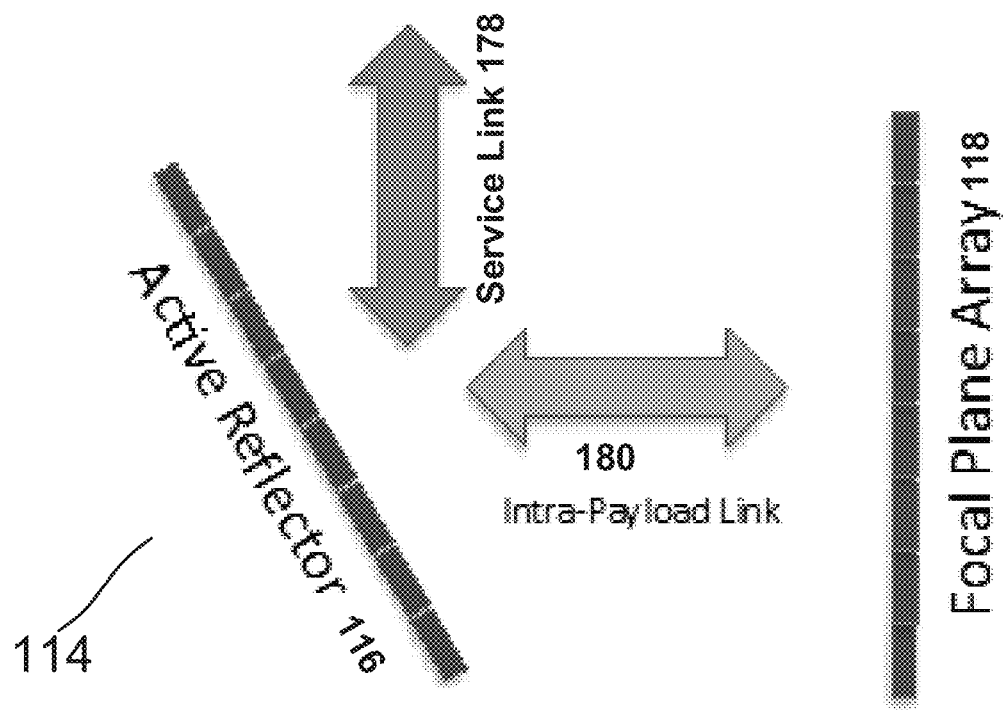
FIG. 1F shows an example of a system with an active reflector tile and a focal plane tile, according to one aspect of the present disclosure.

Active Reflector Configuration:

FIG. 1F shows an example of the active reflector system 114 with active reflector tiles 116 and the focal plane array tiles 118, according to one aspect of the present disclosure. A service link 178 carries signals between active reflector tiles 116 and the passive reflector 106 (not shown in FIG. 1F). The focal plane array tiles 118 receive and transmit signals via an intra-payload link 180 between the active reflector tiles 116 and the focal plane array tiles 118. The signals at the service link 178 and 180 may be isolated by a circulator, frequency conversion or cross polarization, as described below in detail.

Figure 1G:
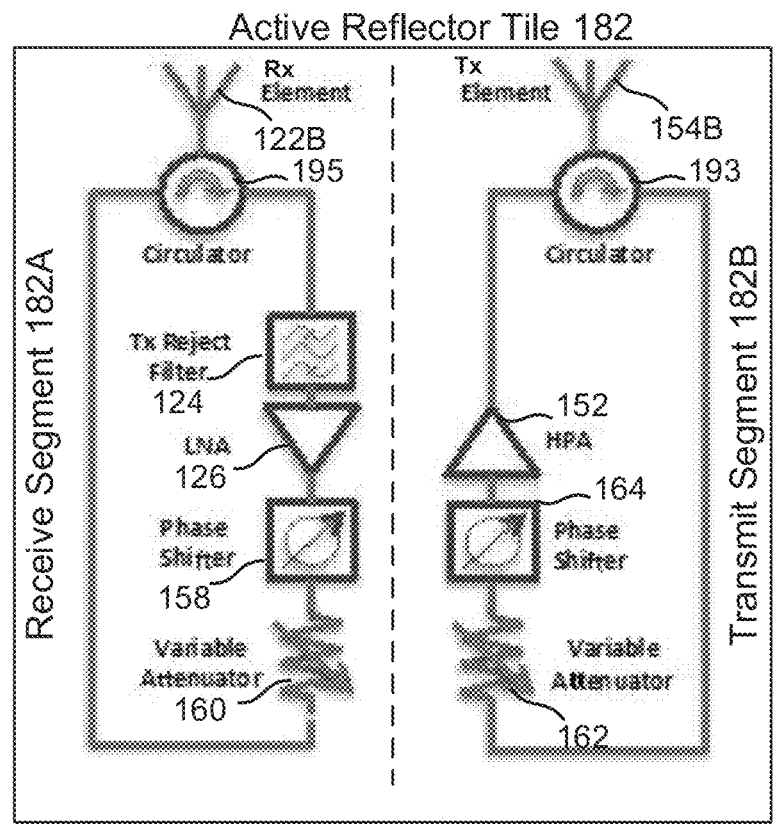
FIG. 1G shows an example of an active reflector tile and a focal plane tile with a circulator, according to one aspect of the present disclosure.
Figure 1G:
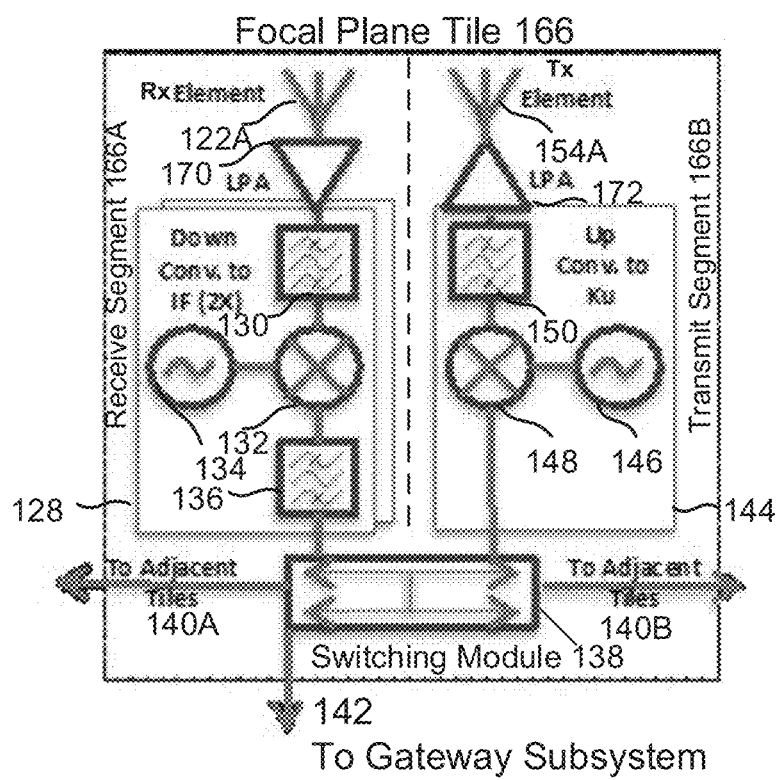

FIG. 1G shows an active reflector tile 182 and a focal plane tile 166 of the active reflector system 114, according to one aspect of the present disclosure. The active reflector tile 182 includes a circulator 195 in a receive (Rx) segment 182A and a circulator 193 in the transmit (Tx) segment 182B, according to one aspect of the present disclosure. A circulator is a passive, non-reciprocal three- or four-port device, in which a RF signal entering any port is transmitted to a next port in rotation. A port in this context is a point where an external waveguide or transmission line (such as a micro-strip line or a coaxial cable), connects to the device. For a three-port circulator, a signal applied to a first port only comes out of a second port; a signal applied to the second port only comes out of a third port; and a signal applied to the third port only comes out of the first port. The signals received via the service link 178 and intra-payload link 180 can be isolated using the circulators 195 and 193 of the receive and transmit segments.

The functionality of the remaining components of active reflector tile 182 (e.g. reject filter 124, LNA 126, phase shifter 158, variable attenuator 160 in the receive segment 182A, and HPA 152, phase shifter 164 and variable attenuator 162 in the transmit segment 182B) and the focal plane array tile 166 (for example, the switching module 138, LPA 170, and module 128 in the receive segment 166A, and module 144 and LPA 172 in the transmit segment 166B) are similar to the various components of the tiles described above with respect to FIGS. 1B-1D, and for brevity sake, these components are not described again.

Figure 1H:
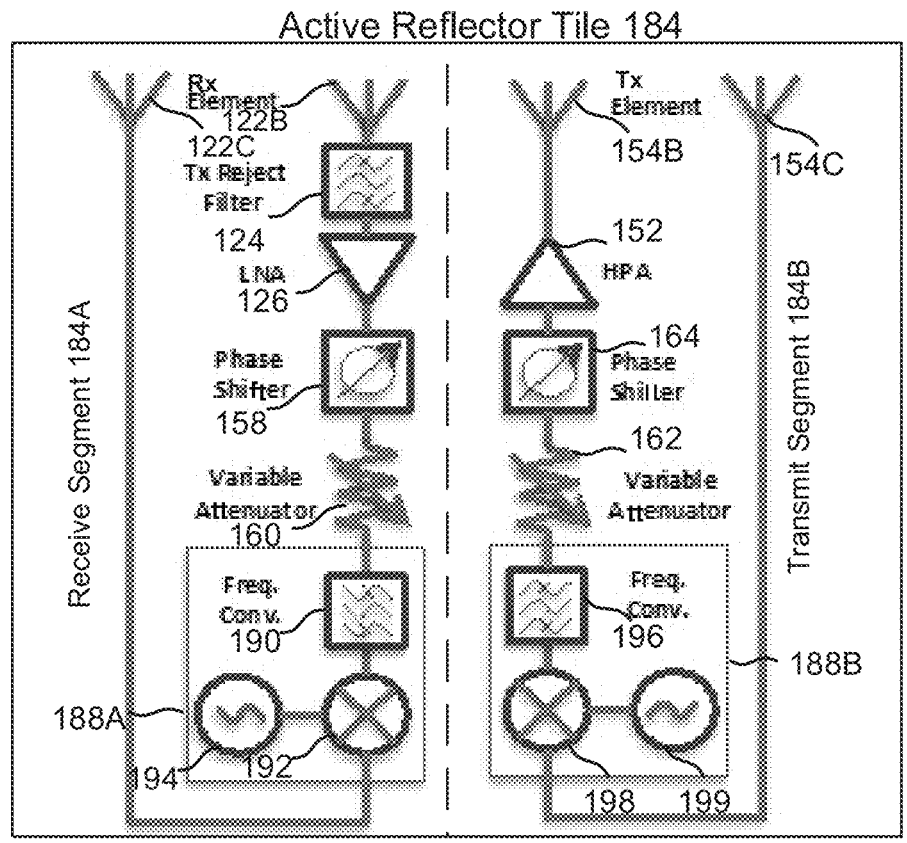
FIG. 1H shows an example of an active reflector tile and a focal plane tile with a frequency converter, according to one aspect of the present disclosure.
Figure 1H:
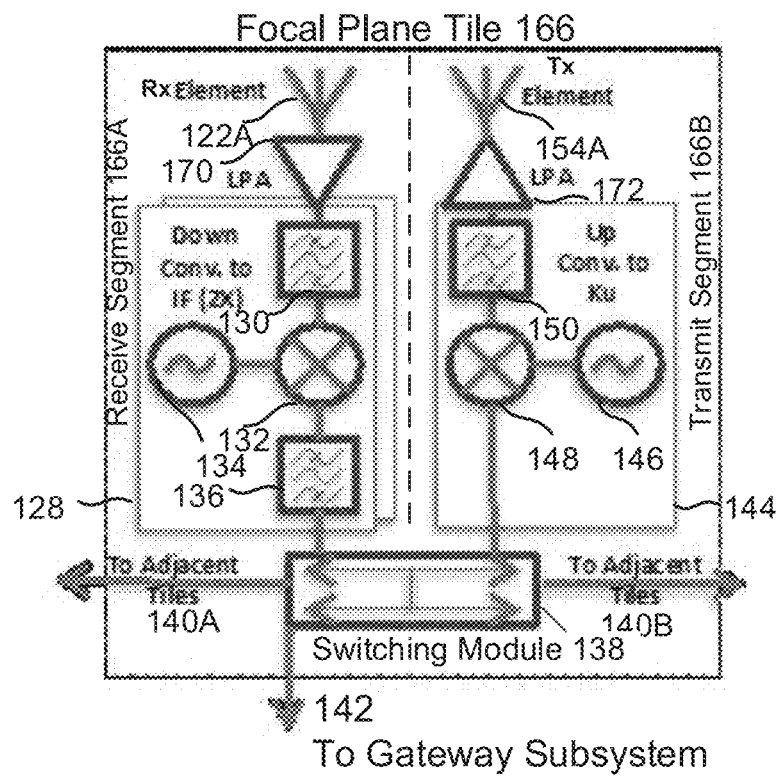

FIG. 1H shows an active reflector tile 184 with a receive segment 184A and a transmit segment 184B, according to one aspect of the present disclosure. The receive segment 184A includes a frequency converter 188A, and the transmit segment includes a frequency converter 188B that are used to isolate signals at the service link 178 and intra-payload link 189. The frequency converter 188A includes a filter 190, a mixer 192 and an oscillator 194. The frequency converter 188B includes a filter 196, a mixer 198 and an oscillator 199. The frequency of the signals at links 178 and 189 are isolated using the frequency converters, mixers and the oscillators. An output from the frequency converter 188A is sent to the focal plane tile 166 via element 122C, while an output from frequency converter 188B is sent to the focal plane tile 166 via element 154C.

The functionality of the remaining components of active reflector tile 184 (e.g. reject filter 124, LNA 126, phase shifter 158, variable attenuator 160 in the receive segment 184A and HPA 152, phase shifter 164 and variable attenuator 162 in the transmit segment 184B) and the focal plane array tile 166 (for example, the switching module 138, LPA 170, and module 128 in the receive segment 166A, and module 144 and LPA 172 in the transmit segment 166B) are similar to the various components of the tiles described above with respect to FIGS. 1B-1D, and for brevity sake, these components are not described again.

Figure 1I:
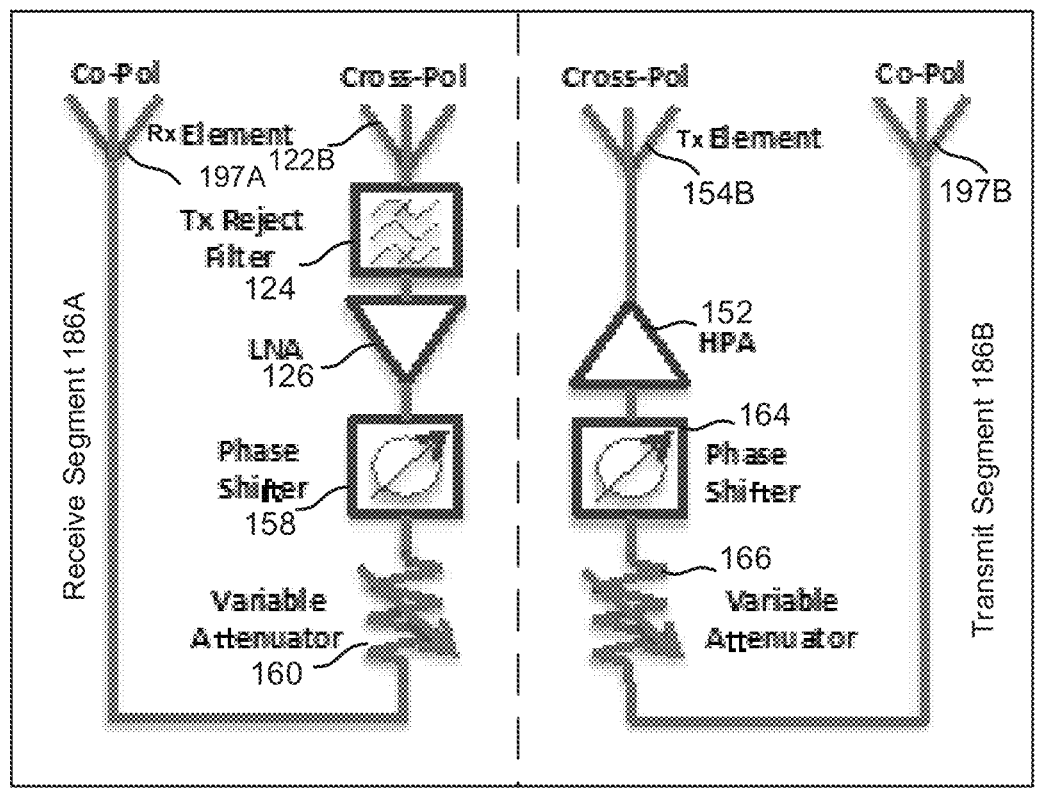
FIG. 1I shows an example of an active reflector tile and a focal plane tile using cross-polarization for signal isolation, according to one aspect of the present disclosure.
Figure 1I:
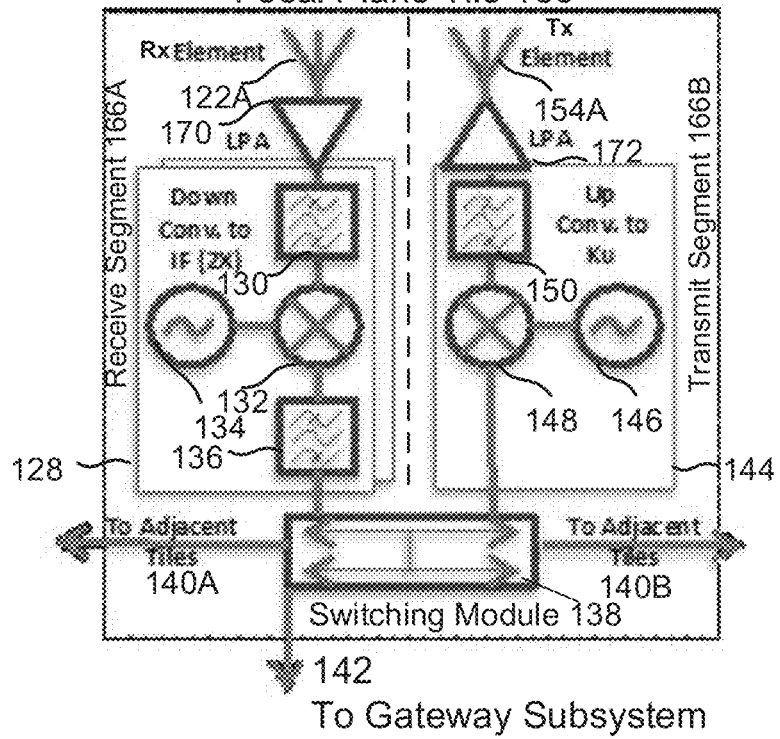

FIG. 1I shows a schematic of an active reflector tile 186 with a receive segment 186A and a transmit segment 186B. The active reflector tile 186 uses cross polarization via elements 197A, 197B, 122B and 154B to isolate signals received via service link 178 and the intra-payload link 189. If the intra-payload link 189 were V-pol or Right Hand Circular Polarization (RHCP), then the service link 178 would use H-pol or Left Hand Circular Polarization (LHCP).

The functionality of the remaining components of active reflector tile 186 (e.g. the reject filter 124, LNA 126, phase shifter 158, variable attenuator 160 in the receive segment 186A and HPA 152, phase shifter 164 and variable attenuator 162 in the transmit segment 186B) and the focal plane array tile 166 (for example, the switching module 138, LPA 170, and module 128 in the receive segment 166A, and module 144 and LPA 172 in the transmit segment 166B) are similar to the various components of the tiles described above with respect to FIGS. 1B-1D, and for brevity sake, these components are not described again.

In one aspect, the tile based payload systems described above can be used in various frequency bands, including X, Ku, Ka, Q, V, and others. The various tile-based systems 102, 112 and 114 may be customized for different antenna geometries, e.g. Co-axial, off-set feed, Gregorian, Cassegrain or direct radiating. Single orthogonal or dual polarization may be used for implementing the various configurations of the present disclosure.

In one aspect, a satellite payload system is provided. The system includes a plurality of active reflector tiles interfacing with a plurality of focal plane tiles that interface with a reflector for receiving and transmitting signals. An active reflector tile of the plurality of active lens tiles include a receive segment and a transmit segment. The receive segment of the active lens tile includes a first circulator to isolate a receive signal from a transmit signal of the transmit segment and a low noise amplifier to amplify the receive signal. The transmit segment of the active reflector tile includes a second circulator to isolate the transmit signal from the receive signal and a high power amplifier to amplify an output of a phase shifter receiving the transmit signal.

A focal plane tile of the plurality of focal plane tiles includes a receive segment, a transmit segment and a switching module. The receive segment of the focal plane tile includes a first frequency conversion module to convert frequency of the received signal to an Intermediate Frequency. The transmit segment of the focal plane tile includes a second frequency conversion module that converts a frequency of the transmit signal to a Radio Frequency. The switching module receives an output from the receive segment of the focal plane tile and switches the output to another focal plane tile.

Figure 2:
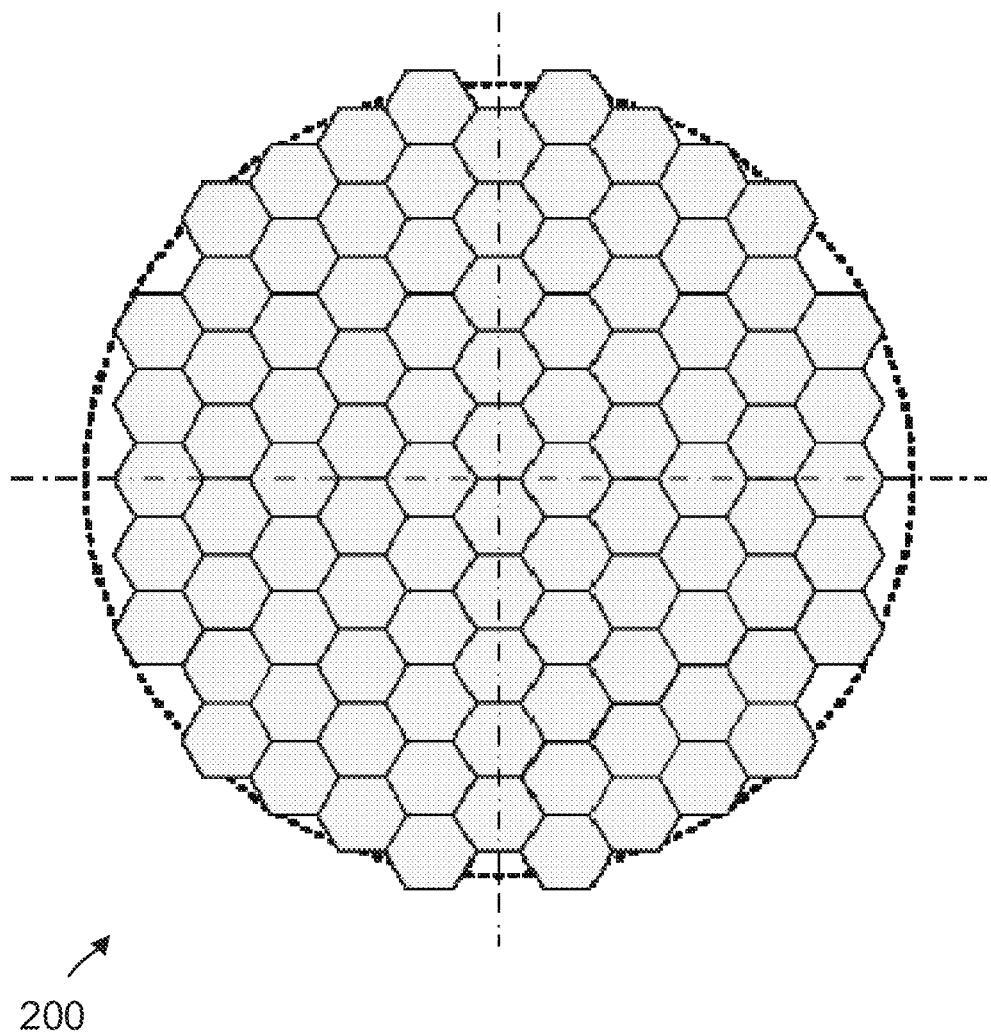
FIG. 2 shows an example of arranging payload tiles in an array, according to one aspect of the present disclosure.

Tile Array:

FIG. 2 shows an example of arranging the various tiles for payload systems 102, 112 and 114 in an array 200 for satellite payloads. Array 200 enables multiple signals to be switched to create a signal path between one or a small subset of receive elements in the focal plane to one or a small subset of transmit element on the focal plane, described above in detail. The beam forming for a satellite payload is handled by a passive reflector or divided between the passive reflector and the active lens/active reflector tiles. Phase shifters or delay lines in the active lens or active reflector enables the tiles to focus a signal. When this capability is used in conjunction with a passive reflector, it can increase or decrease the overall focal length of a system. Decreasing the focal length is desirable for satellite integration because it would reduce the overall size of a focal array. The ability of the active lens or active reflector to focus a signal also enables the tiles to be used in a direct radiating mode without the passive reflector.

Dynamic Power Sharing Using SSPAs:

In one aspect, the technology disclosed herein is used to replace certain traditional HTS components, e.g. TWTAs by Solid State Power Amplifiers (SSPAs). As described below in detail, power sharing between beams is enabled by selectively turning on and turning off power to SSPAs, based on traffic patterns and a number of beams that are needed to cover a certain geographical area.

Figure 3A:
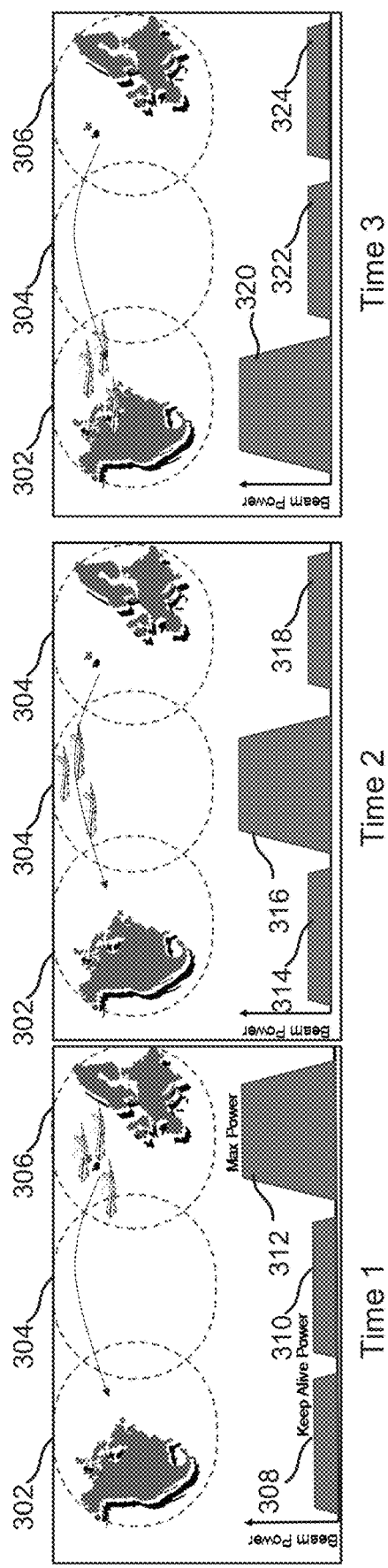
FIG. 3A shows an example of power sharing for satellite beams.

FIG. 3A shows an example of a system 300 for power sharing between satellite beams at different times, namely, between time 1, 2 and 3. The geographical areas are shown as 302, 304 and 306. The graphical illustration of beam power 308, 310 and 312 is for time 1. The graphical illustration of beam power 314, 316 and 318 is for time 2. The graphical illustration of beam power 320, 322 and 324 is for time 3. The changes in beam power is to accommodate changes in traffic pattern.

Power sharing between beams has traditionally been accomplished by moving high power RF signals between downlink beams. This has been accomplished by power dividing an output of TWTAs using an OMUX (see FIG. 3B) or by using multiple TWTAs in an MPA (Multi-Port Amplifier) configuration connected by Butler matrices (see FIG. 3C).

TWTAs are vacuum tubes amplifiers that are frequently used in satellite applications because of their high power and efficiency. A typical TWTA may weigh 2 kg to 3 kg including the amplifier and an electric power conditioning (EPC) unit, may have a dimension of 37 cm by 9 cm by 9 cm, with a saturated RF power of 100 W to 200 W and a saturated efficiency of 65%.

Figure 3B:
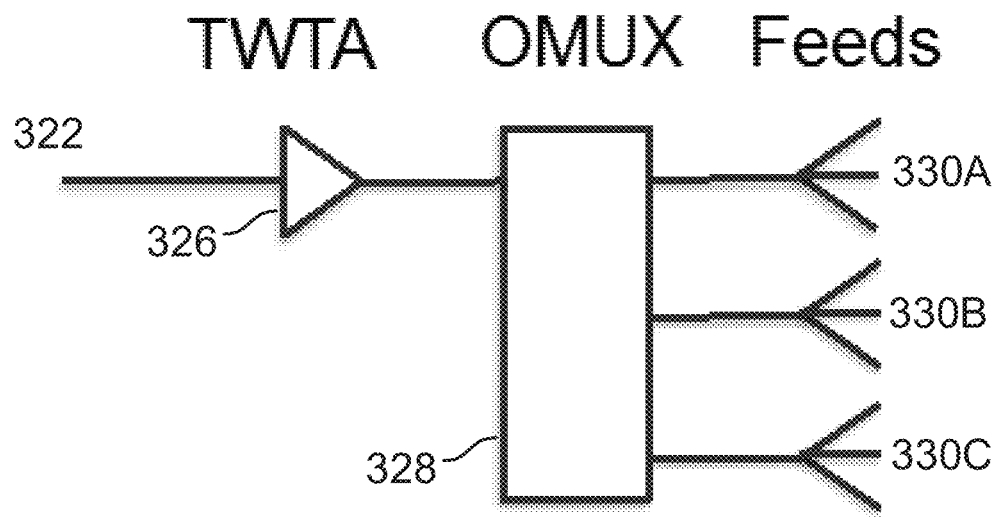
FIG. 3B shows an example of a conventional system for power sharing in satellite beams.

To share power across multiple spot beams, FIG. 3B shows a conventional system where TWTA 326 receives an input 332 and generates an output. The output is provided to an OMUX 328 using a low-loss waveguide.

The OMUX 328 has a number of circulators and cavity filters that divide the output spectrum of the TWTA output into difference channels based on frequency. The OMUX 328 outputs 330A-330C are then connected to the spot beam feeds using waveguides. An OMUX typically weighs around 1 kg per output. Power can be routed to each output beam by up linking carriers at different frequencies and power can be moved from beam to beam by changing the drive level of each carrier.

The downsides of power sharing a single TWTA using an OMUX is that power is limited to that of a single amplifier and the available spectrum has to be divided into smaller channels. In most cases, TWTAs are power divided amongst only two to four beams at a time and this is undesirable. Furthermore, both TWTA and OMUX's are heavy and can be expensive to fabricate.

Figure 3C:
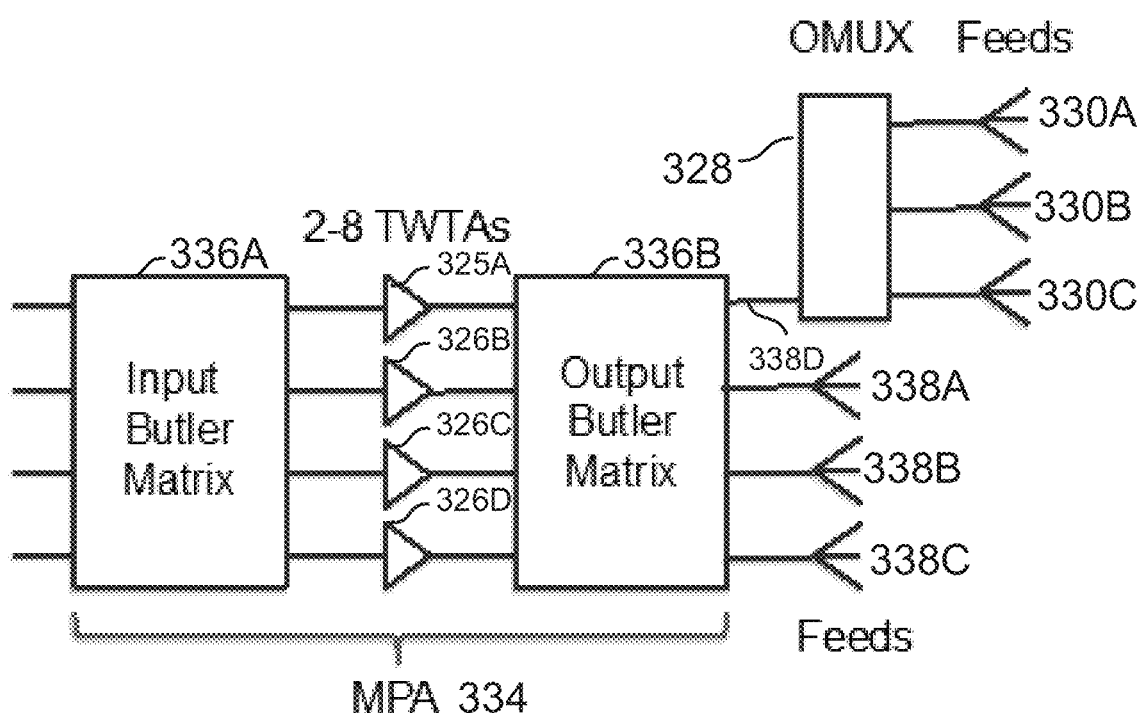
FIG. 3C shows another example of a conventional system for power sharing in satellite beams.

MPAs offer some flexibility in power sharing but are more complex. FIG. 3C shows a MPA 334 where a group of TWTAs 326A-326D are power combined using Butler matrices 336A/336B. The Butler matrices 336A/336B are special combination of hybrid power dividers and combiners that are placed before and after the group of TWTAs 326A-326D. MPA 334 has a number of input and output ports equal to the number of TWTAs. The drive level at each input port determines the output level at a corresponding output port up to the combined power of all of the TWTAs in the MPA 334. Setting the input levels at each input port allows the total power of the TWTAs in the MPA 334 to be divided arbitrarily across the output ports (338A-338C). Combining multiple TWTAs in an MPA creates a larger pool of power that can be shared across more beams. Each output port (e.g. 338D) can be further divided using OMUX 328 into more beams (e.g. 330A-330C).

Power sharing by moving high power RF between beams is complex and expensive. TWTAs, OMUXs, Butler matrices, and the connecting wave guides are large, heavy, and complicated. Two to seven kg of equipment is required for each beam. And even under the best scenario, power can only be shared across less than a dozen beams.

The present disclosure provides a better solution with SSPAs that are smaller in size than TWTAs, lower in mass, and cheaper. SSPAs provide a cost-effective solution to share DC power across beams rather than RF power, creating simplified satellite payloads. SSPAs are available in a variety of technologies including GaAs, SiGe and GaN. GaN amplifiers are desirable for space applications because recent advancements of using GaN on a diamond substrate have led to amplifier efficiencies above 50%. This may be lower than the efficiency of a typical TWTA but the small size of SSPAs allows them to be mounted near or on the beam feed, eliminating 1 dB or more of waveguide loss typical in a TWTA based system.

As an example, a 16 W Ku-band GaN SSPA from the company Quorvo (e.g. Model No. TGA2760-SM) has a dimension of 0.8 cm by 1.0 cm by 0.2 cm. While this may have lower power than a typical Ku-band TWTA, at less than 1 gram in mass, it is at least 2000 times lighter than a typical TWTA and 18,000 times lower in volume. In other words, for the same mass as a TWTA, it is possible to install 200 times as much RF power and still occupy $\frac{1}{9}^{th}$ the volume of a single TWTA. Thus, for the same mass as a TWTA, one can install more amplifier power. This enables the power sharing system to move power around between beams by selectively powering on and off amplifiers. The total DC power remains constant but which SSPAs are turned on or off determines where the power is distributed for a satellite payload.

Figure 3D:
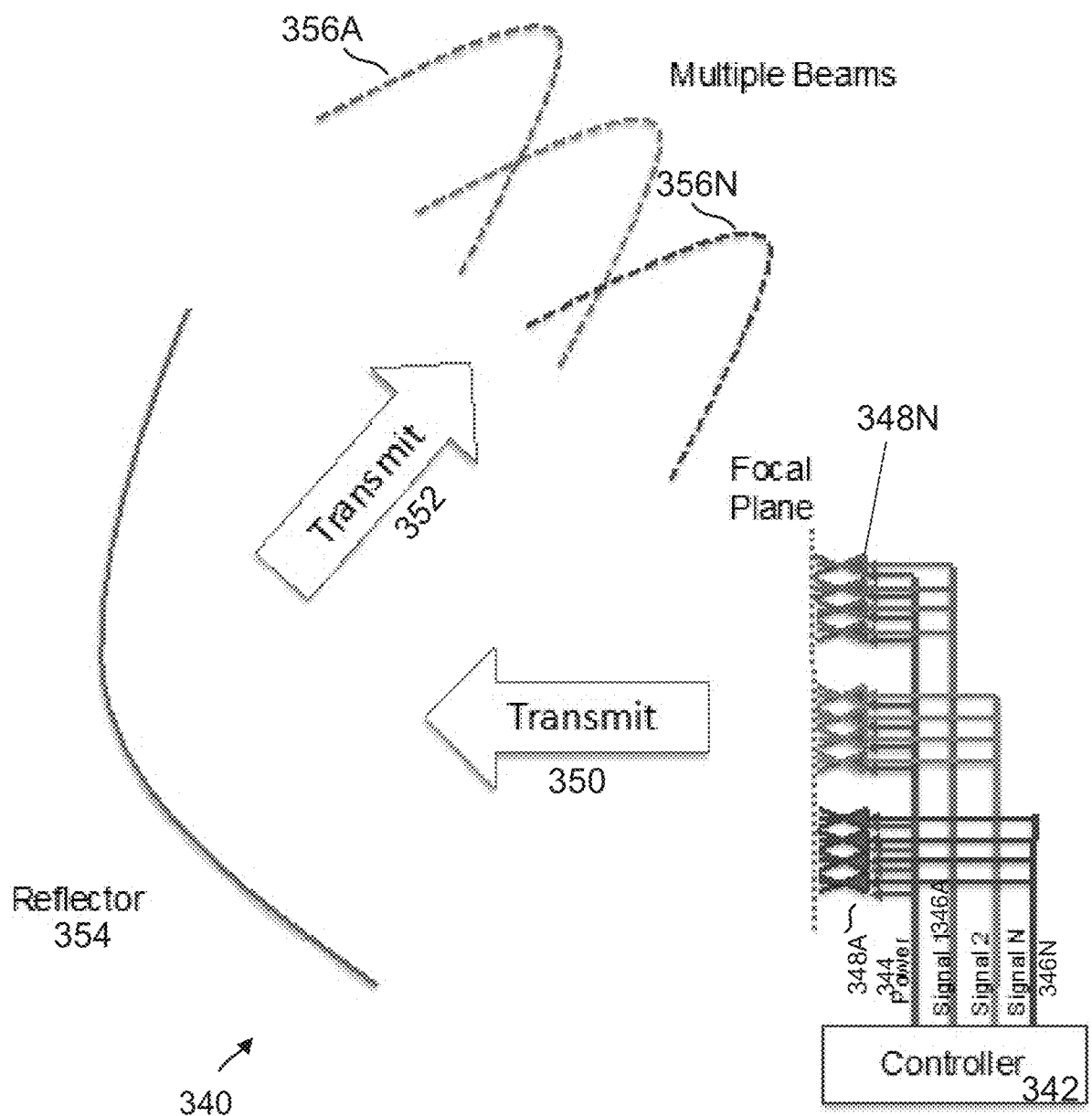
FIG. 3D shows an example of using solid state power amplifiers (SSPAs) in a satellite payload, according to one aspect of the present disclosure.

FIG. 3D shows an example of a SSPA based system 340. A reflector 354 is used to generate multiple coverage beams 356A-356N on the ground. The reflector 354 can be a solid reflector, fixed mesh reflector, or unfurlable mesh reflector. The reflector 354 can be in any arrangement such as center feed, Cassegrain, Gregorian, on-axis, or off-set. A large diameter unfurlable reflector is desirable because a high gain reduces power requirements per beam, however, the adaptive aspects of the present disclosure are not limited to an unfurlable reflector.

Each beam 356A-356N is generated by one (single feed per beam) or multiple (multi-feed per beam) feeds at the focal plane of the reflector 354. The communication between the focal plane of the satellite payload and the reflector is shown by 350 and the multiple beams from the reflector are shown by the arrow 352. The feeds themselves can be horns, patches, dipoles, slots, dielectric rods, or any similar technology. Each feed is connected to one or more SSPAs 348A-348N. If multiple SSPAs are connected to the same feed, they can be power combined with a waveguide, stripline or micro-strip combiners or similar technology. In cases where multiple feeds per beam and/or multiple SSPAs per feed are used, signal path lengths are the same so that the SSPAs remain in phase without having to use a phase shifter. Each SSPA can be powered by a power signal 344 individually or in groups and is connected to an input signal source (346A-346N).

In cases where multiple SSPAs are connected to a feed, the SSPAs may be connected to the same or different signal sources or the source may be selectable. The number of SSPAs may exceed the available DC power on the satellite.

A controller 342 on the satellite or on the ground determines, which SSPAs are to be powered on and off at any given time within the DC power limits of the satellite payload. The controller 342 may also control the signals of each SSPA.

Figure 3E:
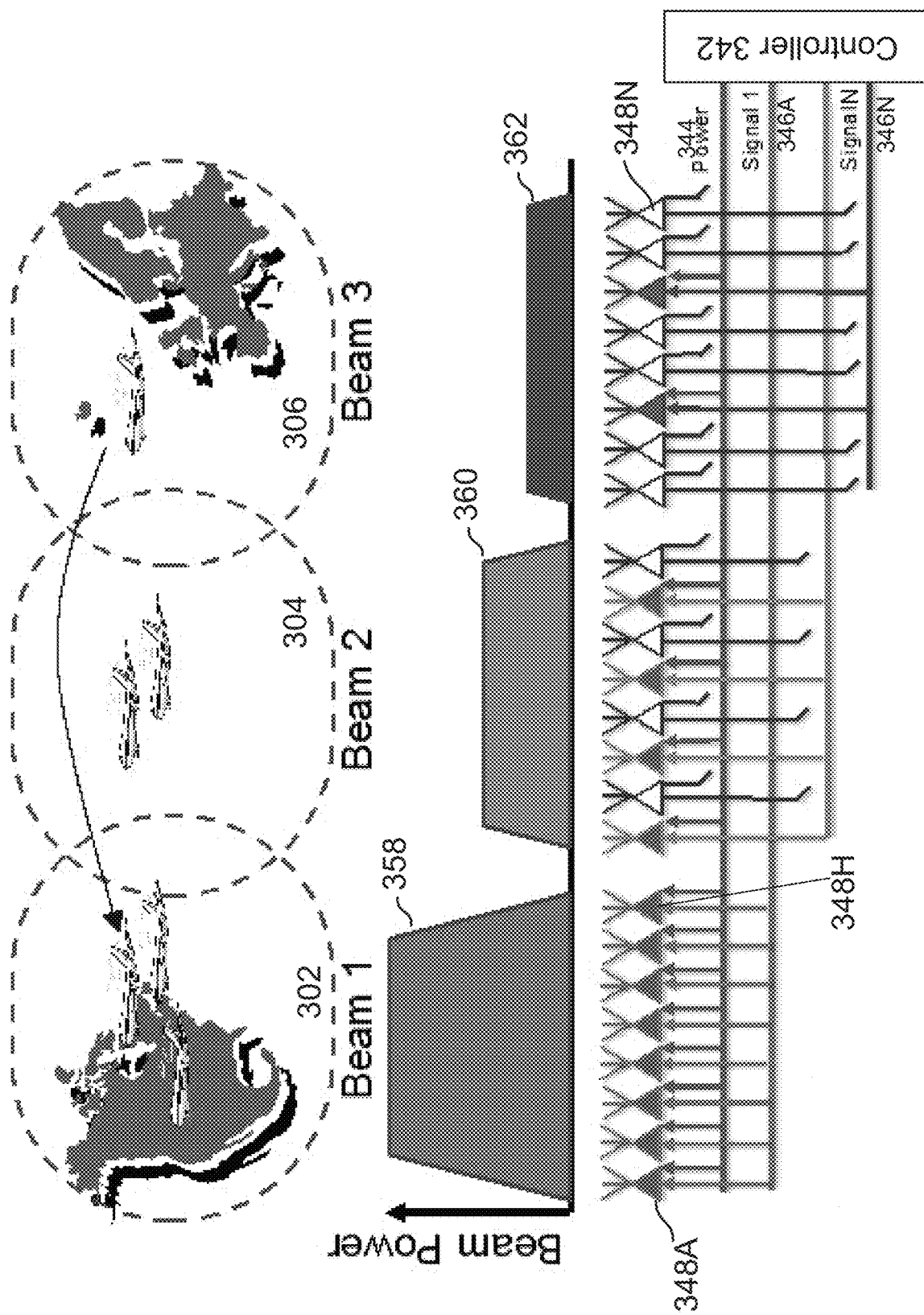
FIG. 3E shows an example of selectively powering SSPAs of the satellite payloads, according to one aspect of the present disclosure.

FIG. 3E shows an example of power sharing between satellite beams, according to one aspect of the present disclosure. A group of aircrafts may move from one region to another (i.e. 302 to 306 via 304 and vice-versa). Different groups of SSPAs (constituting different antenna feeds) are powered, moving power from beam to beam. In one aspect, to keep the total power consumption constant, when one beam is powered, then the other beams may remain unpowered (for example, when beam 1 SSPAs are powered, then SSPAs for Beam 2 and Beam 3 are not powered). This arrangement is useful for a large unfurlable reflector that is used to generate a large number of beams in a sparse traffic area.

In yet another aspect, it may be desirable to operate beams at lower than maximum power and using multiple SSPAs per beam makes it possible to do this without losing any efficiency. Operating at reduced power can be accomplished by backing off an input drive level. In another aspect, bias voltages for the SSPAs may be reset to reduce power. Having multiple SSPAs feed each beam allows the beam power to be varied without losing any efficiency by powering off some fraction of the SSPAs that feed the beam while leaving the remaining SSPAs operating at their most efficient operating level. This reduces the overall operational complexity of a system by operating the system in an automatic level control (ALC) mode without having to constantly adjust an uplink drive level to maintain amplifiers at a desired set point. This allows greater power sharing control without any loss of efficiency.

In one aspect, beam power level is varied by shutting off a fraction of the SSPAs. For example, as shown in FIG. 3E, when Beam 1 358 has the most traffic, every SSPA (348A-348H) feeding Beam 1 is powered on and connected to Signal 1. Beam 2 360 may have less traffic and hence, only half of the SSPAs (shown by the 4 darkened triangles) that feed Beam 2 may be powered on and connected to a Signal 2 (346). Beam 3 362 may have the least traffic so only a quarter of the SSPAs (shown by the two darkened triangles) are powered on and connected to a Signal 3. The power level in each beam can be varied over time by powering on and off SSPAs as long as the total number of powered on SSPAs does not exceed the total available supply DC power at the satellite.

Figure 3F:
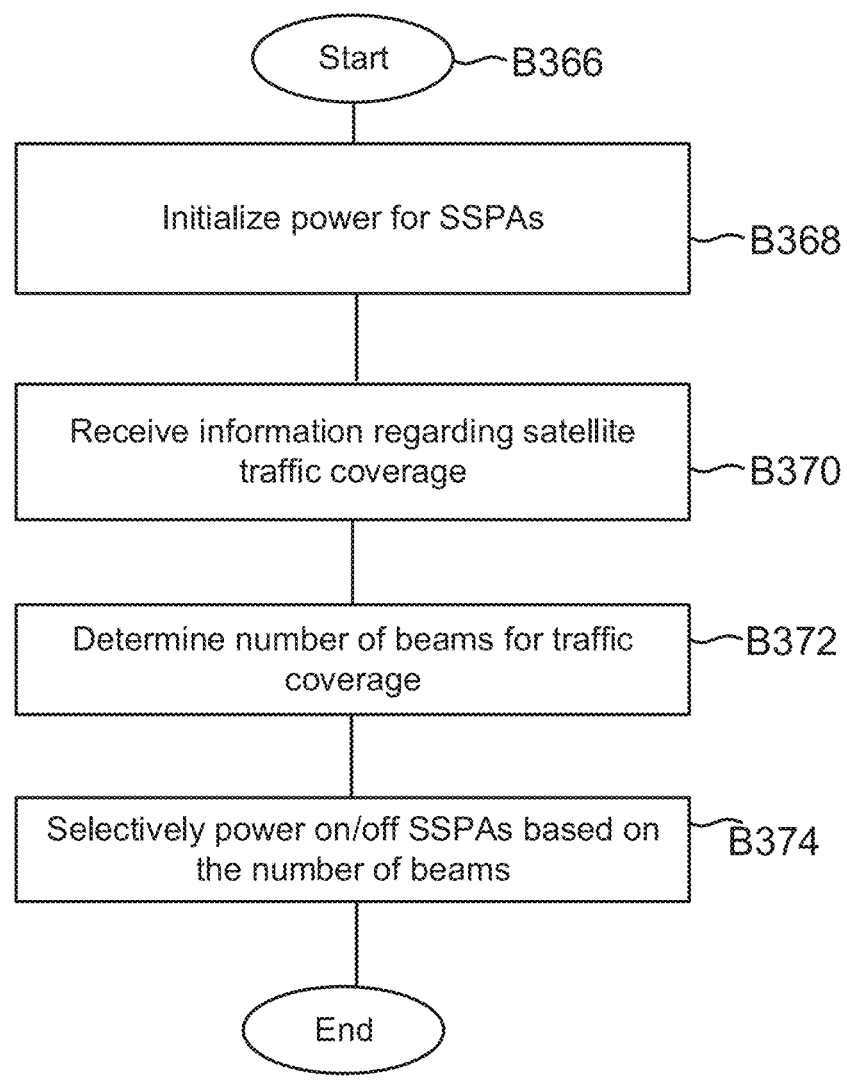
FIG. 3F shows a process for selectively powering SSPAs, according to one aspect of the present disclosure.

FIG. 3F shows a process 364 for power sharing using SSPAs, according to one aspect of the present disclosure. The process begins in block B366. In block B368, power for SSPAs is initialized. In block B370, controller 342 of a satellite payload is provided with information regarding traffic coverage. In block B372, the controller 342 determines the number of beams that may be required for the coverage. In block B374, the controller 342 selectively turns on SSPAs. In one aspect, SSPAs for a first beam may have more power than SSPAs of a second beam.

In conventional single feed per beam systems, the optimum size of the feed for antenna efficiency often exceeds the desired spacing between the feeds. This can be solved by using smaller than optimum feeds at a cost of reduced antenna performance or by using multiple reflectors at a cost of additional mass and complexity. Another solution is to use multiple feeds per beam that occupy the same space as a single optimum feed would. At the boundaries between beams, the feeds are shared by adjacent beams where a single feed would have overlapped. However, in traditional power sharing applications this requires a complex waveguide beamforming network behind the feeds, which are often heavier and more expensive than simply using multiple reflectors. Using multiple feeds per beam with multiple SSPAs per feed eliminates some of the drawbacks of a traditional multi-feed per beam system while retaining the ability to use a single reflector and maintaining high performance of an optimum feed size.

Figure 3G:
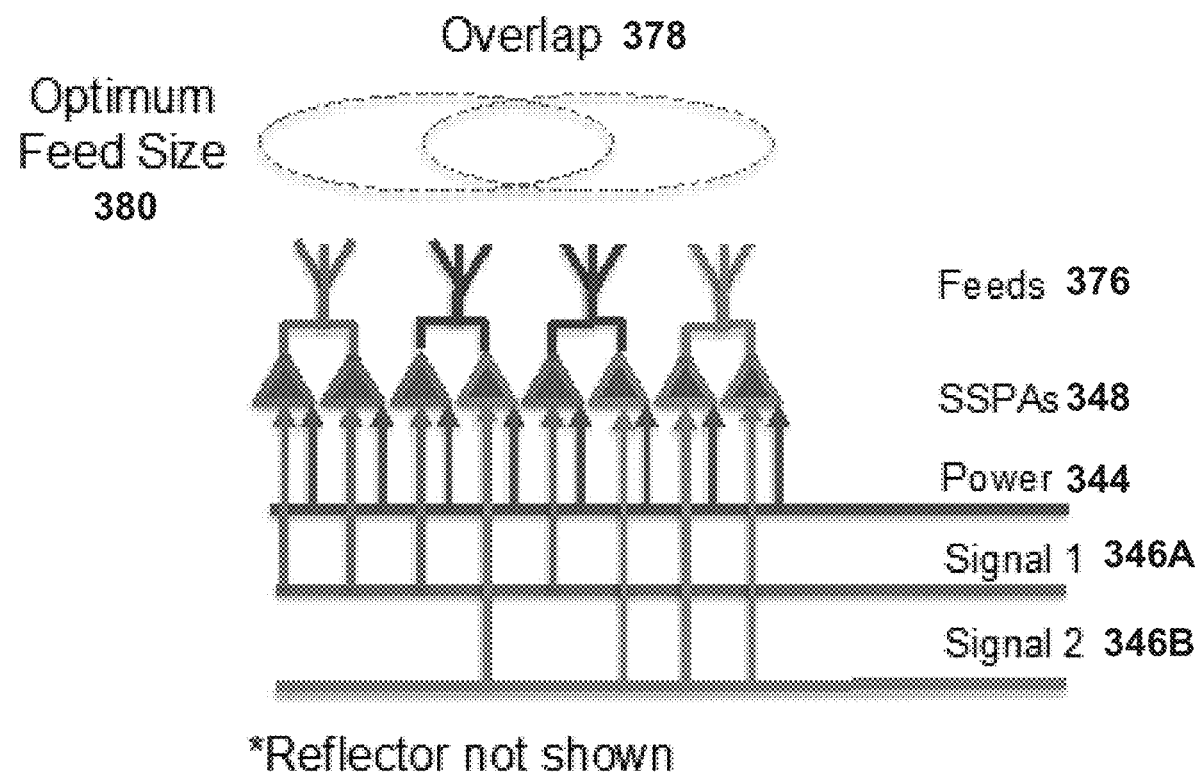
FIG. 3G shows an example of using SSPAs for an optimum feed size, according to one aspect of the present disclosure.

The arrangement of SSPAs in a multi feed per beam with multiple SSPAs per feed is shown in FIG. 3G. In this case, the optimum feed size 380 requires three feeds but the spacing between the feeds is only one feed apart. This creates an overlap 378 of two feeds between the beams. The overlapping feeds are powered by two SSPAs, one that receives input Signal 1 346A and the other that receives input Signal 2 346B. This creates the same effect as a waveguide beamforming network without the weight and complexity.

The various aspects of this disclosure are not limited to the rate at which power can be reallocated amongst the beams. In some cases, it may be desirable to permanently allocate a beam and a number of SSPAs to serve a fixed customer. In other cases, it may be desirable to re-allocate power among beams dynamically to serve changing traffic patterns in the span of hours or minutes. In one aspect, power could be reallocated on a super frame basis in what would effectively be a beam hopping arrangement. Beam hopping would enable more beams to be active during a given time period, providing greater granularity in how resources are allocated and reduce uplink bandwidth/gateway requirements.

The adaptive aspects of the present disclosure has advantages over existing power sharing techniques. Using small SSPA amplifiers allows power to be moved between beams at DC rather than RF level. Traditional power sharing by moving high power RF between beams requires relatively large, complex, heavy, and expensive components like TWTAs, waveguide, OMUXs, and MPAs. Dynamic power sharing with SSPAs enables building an entire payloads on a circuit board, making them much lighter and easier to manufacture. When coupled with a large unfurlable reflector, these light weight payloads could generate hundreds or thousands of beams for the same payload mass and power as a conventional payload with a few dozen beams and with much greater power sharing flexibility.

Figure 4A:
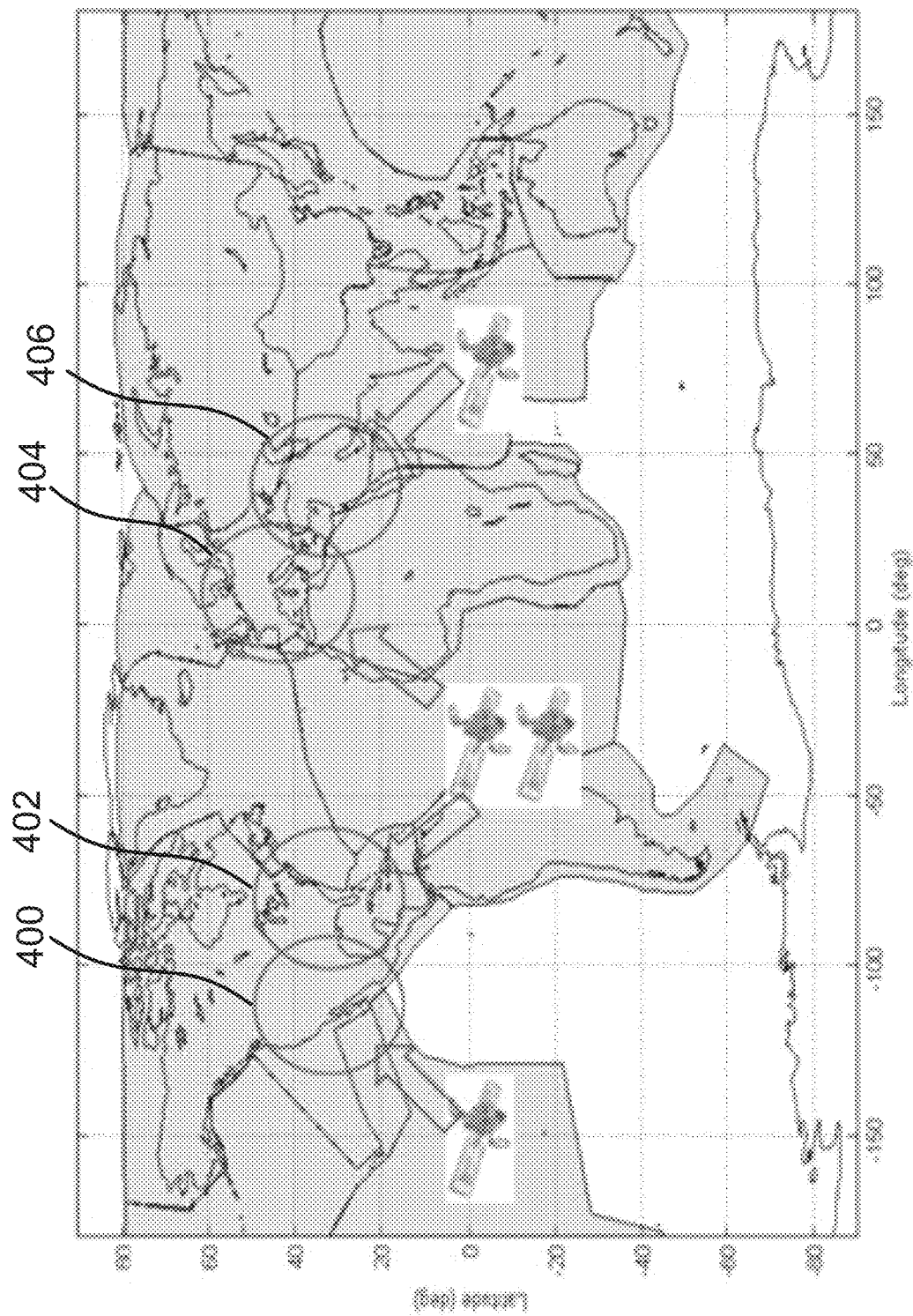
FIG. 4A shows an example of using multiple spot beams for satellite coverage.
Figure 4B:
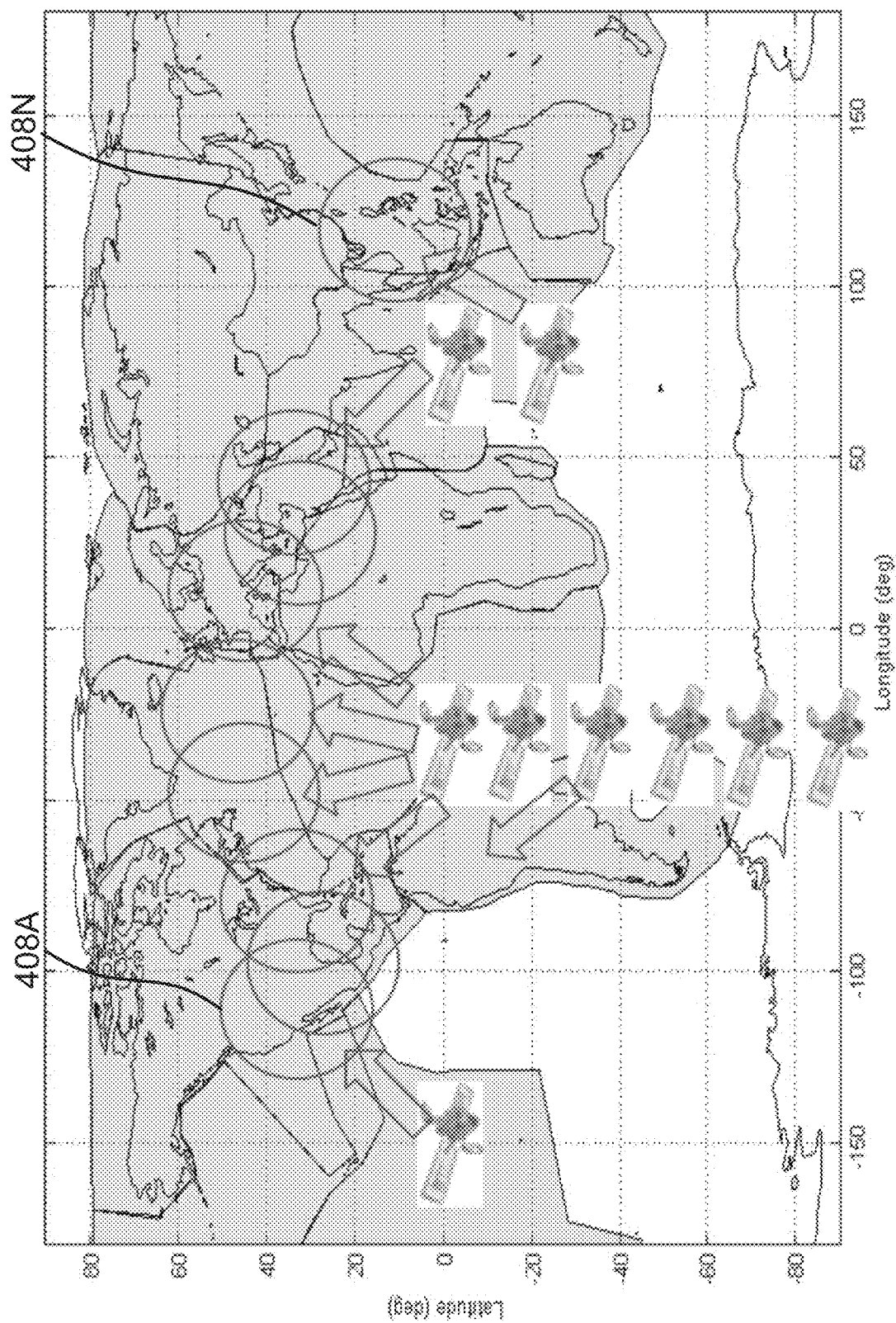
FIG. 4B shows use of multiple spot beams using microsatellites, according to one aspect of the present disclosure.

Micro HTS Systems:

In one aspect, to reduce the cost and complexity of conventional HTS systems, this disclosure provides micro☐HTS systems that are less specialized, can be manufactured and deployed quickly to reduce commitment and risk associated with conventional large HTS systems. A micro-HTS system is provided that has less capacity and coverage than a single large HTS satellite. Multiple micro-HTS systems are deployed to provide coverage equivalent to a large HTS system. Using multiple micro-HTS systems instead of a single large HTS system opens up the use of less desirable and less expensive orbital slots to the east and west of North American and European orbital arcs, as shown in FIG. 4A by circles 400, 402, 404 and 406. As demand grows, capacity can be added to existing regions, and coverage area is expanded by adding more micro-satellites to the existing slots, as shown in FIG. 4B by circles between 408A-408N. Multiple micro-HTS satellites may be added to a slot and cover different areas from the same slot or provide overlapping coverage area. Slots typically comprise 0.1 degree in longitude along the Geostationary Arc, which at a radius of around 42,165 km from the center of the earth forms a box-like area approximately 75 km by 75 km. Thus, a slot has available room to place multiple satellites.

The deployment of new micro-HTS systems is an adaptive process due to a relatively short build cycle. New micro-satellites can be deployed where demand is growing the fastest. Conversely, if demand grows slower than anticipated, the deployment of new satellites can be spread out over more time.

In one aspect, a micro-HTS based deployment includes micro-satellites, preferably less than 400 kg, that can be launched by themselves or in small groups as secondary payloads on other satellite launches, in most cases to Geostationary Transfer Orbit (GTO). The micro-satellites include electric propulsion to enable them to get from GTO to geostationary orbit (GSO) with 100 kg to 150 kg of usable payload. The micro-satellites have power in the range of 1 kW to 3 kW minimizing the cost of the satellite.

The micro-satellites preferably use unfurlable reflectors so that high Effective Isotropic Radiated Power (EIRP) can be achieved with as little payload power as possible. Fixed or other deployable reflectors may also be used.

In one aspect, the micro-satellites preferably use SSPA amplifiers, preferably GAN amplifiers that are small, light and efficient to power a large number of antenna feeds and spot beams. The payload will use the tile configuration and SSPA power sharing as described above.

In one aspect, a micro-satellite uses a flexible channelizer for a payload to adjust a frequency plan of the micro-satellite to an available spectrum at a given orbital slot. The channelizer is preferably an analog "bent pipe" channelizer. In another aspect, a digital channelizer is used.

In one aspect, the micro-satellites are deployed individually or in groups at a single or multiple orbital slots to cover an area that would traditionally be covered by a single large HTS satellite for mobile service. Additional micro-satellites can be added to initial orbital slots to overlay an initial deployment and increase capacity or to cover adjacent regions and expand the coverage.

Figure 4C:
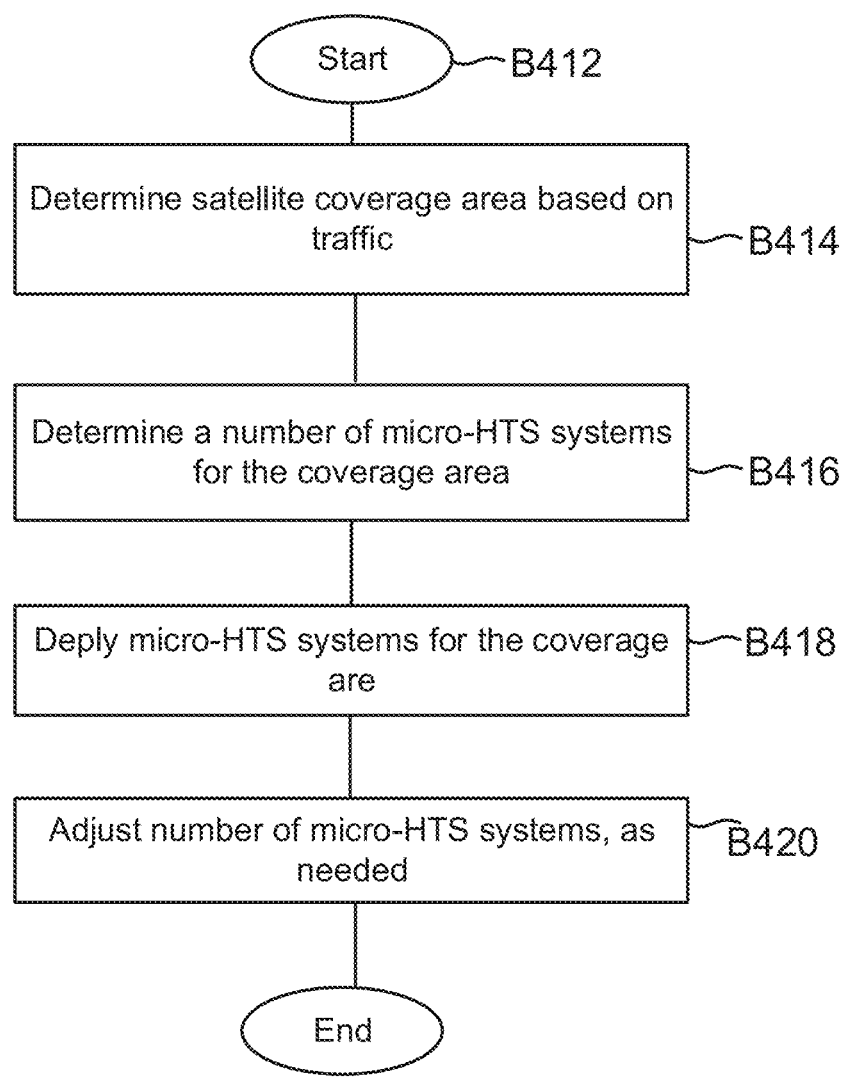
FIG. 4C shows a process for using multiple microsatellites, according to one aspect of the present disclosure.

FIG. 4C shows a process 410, according to one aspect of the present disclosure. The process begins in block B412. In block B414, a geographical coverage area is determined based on user traffic. In block B416, a number of micro-satellites are determined to cover the coverage area. In block B418, the micro-satellites are deployed within the coverage area. The number of micro-satellites is adjusted based on demand in block B420.

Using smaller and simpler micro-satellites enable new satellites and technologies to be brought faster to market. This allows a satellite owner/operators to be more responsive to changing demand and reduces risk of capacity shortage in critical regions or over buying capacity.

The long lead time for traditional HTS satellites has meant that each new HTS satellite has to serve not only an anticipated demand at a time when it enters service but also the demand for a number of years afterwards. This requires projecting demand out into the future by 6 to 8 years, which is risky, and results in unused capacity when the HTS enters service. The unused capacity at beginning of a HTS's life results in waste. By dividing the capacity of a single large HTS satellite into multiple micro-satellites, means that each micro-satellite is filled up faster and less of the capacity is wasted over the lifespan of the micro-satellite.

Thus, methods and systems for satellites have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A satellite payload system, comprising:
a plurality of focal plane array tiles interfacing with a reflector for receiving and transmitting signals;
wherein a focal plane array tile of the plurality of focal plane array tiles includes a receive segment, a transmit segment and a switching module;
wherein the receive segment includes a first filter that isolates a receive signal from a transmit signal, a low noise amplifier that amplifies the receive signal and a first frequency conversion module that converts frequency of the received signal to an Intermediate Frequency;
wherein the transmit segment includes a second frequency conversion module that converts a frequency of the transmit signal to a Radio Frequency;
wherein the switching module receives an output from the receive segment and switches the output to another focal plane array tile; and
wherein the receive signal and the transmit signal are isolated using orthogonal polarization between a receive element at the receive segment and a transmit element at the transmit segment.

2. The system of claim 1, wherein the output from the receive segment is routed to the transmit segment by the switching module.

3. The system of claim 1, wherein the receive segment includes a first phase shifter for phase control of the receive signal and the transmit segment includes a second phase shifter for phase control of the transmit signal.

4. The system of claim 1, wherein a plurality of transmit elements of the plurality of focal plane array tiles are grouped together to form a transmit chain for transmitting signals.

5. The system of claim 1, wherein a plurality of receive elements of the plurality of focal plane array tiles are grouped together to form a receive chain for receiving signals.

6. The system of claim 1, wherein the transmit segment includes an amplifier to amplify an output of the second frequency conversion module.

7. A satellite payload system, comprising:
a plurality of active lens tiles interfacing with a plurality of focal plane tiles that interfaces with a reflector for receiving and transmitting signals;
wherein an active lens tile of the plurality of active lens tiles includes a receive segment and a transmit segment;
wherein the receive segment of the active lens tile includes a first filter to isolate a receive signal from a transmit signal of the transmit segment and a low noise amplifier to amplify the receive signal; and
wherein the transmit segment of the active lens tile includes a high power amplifier to amplify an output of a phase shifter receiving the transmit signal;
wherein a focal plane tile of the plurality of focal plane tiles includes a receive segment, a transmit segment and a switching module,
wherein the receive segment of the focal plane tile includes a first frequency conversion module to convert frequency of the received signal to an Intermediate Frequency;
wherein the transmit segment includes a second frequency conversion module that converts a frequency of the transmit signal to a Radio Frequency; and
wherein the switching module receives an output from the receive segment of the focal plane tile and switches the output to another focal plane tile.

8. The system of claim 7, wherein the plurality of active lens tiles and the focal plane tiles are placed in a can shaped structure such that the active lens tiles are placed above the focal plane tiles.

9. The system of claim 7, wherein the output from the receive segment of the focal plane tile is routed to the transmit segment of the focal plane tile by the switching module.

10. The system of claim 7, wherein the receive segment of the active lens tile includes a first phase shifter for phase control of the receive signal.

11. The system of claim 7, wherein a plurality of transmit elements of the plurality of active lens tiles are grouped together to form a transmit chain for transmitting signals.

12. The system of claim 7, wherein a plurality of receive elements of the plurality of active lens tiles are grouped together to form a receive chain for receiving signals.

13. The system of claim 7, wherein the transmit segment of the focal plane tile includes an amplifier to amplify an output from the second frequency conversion module.

14. A satellite payload system, comprising: a plurality of active reflector tiles interfacing with a plurality of focal plane tiles that interfaces with a reflector for receiving and transmitting signals; wherein an active reflector tile of the plurality of active reflector tiles includes a receive segment and a transmit segment; wherein the receive segment of the active reflector tile includes a first circulator to isolate a receive signal from a transmit signal of the transmit segment and a low noise amplifier to amplify the receive signal; and wherein the transmit segment of the active reflector tile includes a second circulator to isolate the transmit signal from the receive signal and a high power amplifier to amplify an output of a phase shifter receiving the transmit signal; wherein a focal plane tile of the plurality of focal plane tiles includes a receive segment, a transmit segment and a switching module, wherein the receive segment of the focal plane tile includes a first frequency conversion module to convert frequency of the received signal to an Intermediate Frequency; wherein the transmit segment of the focal plane tile includes a second frequency conversion module that converts a frequency of the transmit signal to a Radio Frequency; and wherein the switching module receives an output from the receive segment of the focal plane tile and switches the output to another focal plane tile.

15. The system of claim 14, wherein the plurality of active reflector tiles and the focal plane tiles are arranged in an array.

16. The system of claim 14, wherein the output from the receive segment of the focal plane tile is routed to the transmit segment of the focal plane tile by the switching module.

17. The system of claim 14, wherein the receive segment of the active reflector tile includes a first phase shifter for phase control of the receive signal.

18. The system of claim 14, wherein the active reflector tile uses cross-polarization to isolate the receive signal and the transmit signal.

19. The system of claim 14, wherein the active reflector tile uses frequency conversion to isolate the receive signal and the transmit signal.

* * * * *